US009838462B2

(12) United States Patent
Yang

(10) Patent No.: US 9,838,462 B2
(45) Date of Patent: Dec. 5, 2017

(54) METHOD, APPARATUS, AND SYSTEM FOR DATA TRANSMISSION

(71) Applicant: Huawei Technologies Co., Ltd., Shenzhen, Guangdong (CN)

(72) Inventor: Jishang Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 650 days.

(21) Appl. No.: 14/476,174

(22) Filed: Sep. 3, 2014

(65) Prior Publication Data
US 2015/0063194 A1 Mar. 5, 2015

(30) Foreign Application Priority Data

Sep. 3, 2013 (CN) .......................... 2013 1 0395295

(51) Int. Cl.
H04H 20/71 (2008.01)
H04L 29/08 (2006.01)
H04L 12/18 (2006.01)
H04L 12/801 (2013.01)

(52) U.S. Cl.
CPC ............ *H04L 67/06* (2013.01); *H04L 12/185* (2013.01); *H04L 47/15* (2013.01)

(58) Field of Classification Search
CPC ........ H04L 67/06; H04L 12/185; H04L 47/15
USPC ...................................................... 370/312
See application file for complete search history.

(56) References Cited

U.S. PATENT DOCUMENTS

| 2006/0088031 | A1* | 4/2006 | Nalawade ............. H04L 12/185 370/390 |
| 2006/0153219 | A1* | 7/2006 | Wong .................... H04L 12/185 370/432 |
| 2006/0209831 | A1 | 9/2006 | Shepherd et al. |
| 2009/0161590 | A1 | 6/2009 | Lewis et al. |
| 2011/0069705 | A1* | 3/2011 | Glasser ............... H04L 12/1836 370/390 |
| 2011/0158234 | A1* | 6/2011 | Sumi ...................... H04L 65/80 370/390 |

(Continued)

FOREIGN PATENT DOCUMENTS

| CN | 1741492 A | 3/2006 |
| CN | 101394342 A | 3/2009 |

(Continued)

*Primary Examiner* — Peter Cheng

(57) ABSTRACT

Embodiments of the present invention provide a method, an apparatus, and a system for data transmission. A network device receives a first multicast protocol packet sent by a network virtualization edge, NVE, for joining a multicast group, obtains first information, establishes an NVE interface of the multicast group according to the first information, and determines second information according to the first information, wherein the first information comprises a correspondence between each NVE connected to the network device and a multicast group to which each NVE belongs, and the second information comprises each multicast group in which the network device is involved; and sends the second information to a NVO3 manager, so that the NVO3 manager establishes a unicast tunnel interface of the multicast group between the network device and the at least one another network device according to the second information.

10 Claims, 8 Drawing Sheets

(56) References Cited

U.S. PATENT DOCUMENTS

2015/0055651 A1* 2/2015 Shen .................. H04L 12/1854
   370/390

FOREIGN PATENT DOCUMENTS

| CN | 101904132 A | 12/2010 |
| CN | 102137431 A | 7/2011 |
| CN | 103200069 A | 7/2013 |

* cited by examiner

1300

1400

METHOD, APPARATUS, AND SYSTEM FOR DATA TRANSMISSION

CROSS-REFERENCE TO RELATED APPLICATION

This application claims priority to Chinese Patent Application No. 201310395295.2, filed on Sep. 3, 2013, which is hereby incorporated by reference in its entirety.

TECHNICAL FIELD

Embodiments of the present invention relate to network technologies, and in particular, to a method, an apparatus, and a system for data transmission.

BACKGROUND

In network technologies, in order to improve efficiency of a server, server virtualization becomes a trend. In a network in which a virtualization technology is used, data or packets may be transmitted by using the Virtual eXtensible Local Area Network (Virtual eXtensible Local Area Network in English, VXLAN for short) protocol or the Network Virtualization using Generic Routing Encapsulation (Network Virtualization using Generic Routing Encapsulation in English, NVGRE for short) protocol; these two protocols can provide better support for virtual machine (Virtual Machine in English, VM for short) migration and mass tenants. Generally, a specific packet header, for example, a User Datagram Protocol (User Datagram Protocol, UDP for short) or Internet Protocol (Internet Protocol, IP for short) header, is added to an original Ethernet packet, so that a VM may be migrated as required in a virtual network. In addition, a VXLAN network identifier (VXLAN Network Identifier in English, VNI for short) in a VXLAN header or a virtual subnet identifier (Virtual Subnet Identifier, VSID for short) in an NVGRE header is used to identify a tenant or a subnet of a tenant, thereby implementing supporting of mass tenants. Technologies, in which a virtual network (Layer 2 network) in which addressing is performed by using the media access control (Media Access Control in English, MAC for short) may be overlayed over networks (Layer 3 network) including the NVGRE and the VXLAN, in which addressing is performed by using the IP are collectively referred to as network virtualization over L3 (Network Virtualization over L3 in English, NVO3 for short) technologies. A device that performs Ethernet or NVO3 encapsulation and decapsulation on a packet is referred to as a network virtualization edge (Network Virtualization Edge in English, NVE for short).

In the NVO3 technology, a packet is transmitted in a Layer 3 network, which, however, does not support forwarding of unknown unicast or broadcast packets. Therefore, the NVE can send these types of packets only by mapping them to a multicast group or by converting them into unicast packets. In addition, when performing NVO3 encapsulation on an Ethernet packet, the NVE needs to learn a connection relationship between a destination VM or destination host and the NVE. That is, the NVE needs to learn binding relationships between all related VMs or hosts (at least VMs or hosts within a virtual subnet corresponding to a VNI that exists on the NVE) and NVEs of the related VMs or hosts.

In the prior art, an NVE performs head-end replication on a broadcast, unknown unicast and multicast (Broadcast, Unknown unicast and Multicast in English, BUM for short) packet. That is, after receiving a BUM packet and performing multicast tunnel encapsulation on the BUM packet, an NVE of a source VM or host sends the BUM packet directly to a network device; the network device sends the BUM packet to at least one another network device corresponding to a multicast group according to a multicast distribution tree; then, the network device that receives the BUM packet sends the BUM packet to an NVE at a receive end; and the NVE at the receive end performs multicast tunnel decapsulation on the BUM packet.

However, in the foregoing solution, the network device needs to support a multicast routing protocol to construct the multicast distribution tree. The network device generally does not necessarily support the multicast routing protocol; in addition, multicast is not deployed in many existing networks. Therefore, the network device and the at least one another network device need to be modified to support multicast transmission. This causes high difficulty in performing the foregoing solution and a high implementation cost.

SUMMARY

The present invention provides a method, an apparatus, and a system for data transmission, so as to solve a problem of difficulty in performing a method for data transmission in the prior art.

According to a first aspect, the present invention provides a method for data transmission, including:
  performing, by a network virtualization edge NVE, multicast tunnel encapsulation on a first broadcast, unknown unicast and multicast BUM packet to be sent, where the multicast tunnel encapsulation includes adding information for indicating a multicast group to which the first BUM packet belongs to the first BUM packet; and
  sending, by the NVE, the first BUM packet on which the multicast tunnel encapsulation is performed to a network device, so that the network device replicates the first BUM packet to another NVE that belongs to the multicast group and is connected to the network device, and/or that the network device performs unicast tunnel encapsulation on the first BUM packet and replicates the first BUM packet to at least one another network device corresponding to the multicast group through a unicast tunnel interface of the multicast group.

In a first possible implementation of the first aspect, the method further includes:
  receiving, by the NVE, a second BUM packet sent by the network device, where multicast tunnel encapsulation is performed on the second BUM packet; and
  performing, by the NVE, multicast tunnel decapsulation on the second BUM packet, parsing the second BUM packet, and sending the second BUM packet to a corresponding virtual machine according to information obtained through the parsing.

With reference to the first aspect or the first possible implementation of the first aspect, in a second possible implementation, before the sending, by the NVE, the first BUM packet on which the multicast tunnel encapsulation is performed to a network device, or before the receiving, by the NVE, a second BUM packet sent by the network device, the method further includes:
  sending, by the NVE, a first multicast protocol packet for joining the multicast group to the network device, where the first multicast protocol packet carries an identifier of the multicast group, so that the network device obtains first information, adds an NVE interface of the multicast group on the network device according to the first information, determines second information according to the first information, and sends the second information to a network virtualization over L3 NVO3 manager, so that the NVO3 manager establishes a unicast tunnel between the network device and the at least one another network device as a multicast group interface according to the second information, where the first information includes a correspondence between each NVE connected to the network device and a multicast group to which each NVE belongs, and the second information includes each multicast group in which the network device is involved.

With reference to the second possible implementation of the first aspect, in a third possible implementation, the method further includes:

sending, by the NVE, a second multicast protocol packet for joining or leaving a multicast group to the network device, where the second multicast protocol packet carries an identifier of the multicast group that the NVE joins or leaves, so that the network device updates, according to the identifier of the multicast group that the NVE joins or leaves, the first information and the NVE interface of the multicast group that the NVE joins or leaves, updates the second information according to the first information, and sends updated second information to the NVO3 manager, so that the NVO3 manager updates a unicast tunnel interface of the multicast group between the network device and the at least one another network device according to the updated second information.

With reference to the second or third possible implementation of the first aspect, in a fourth possible implementation, the method further includes:

receiving, by the NVE, a multicast group state query packet sent by the network device, where the multicast group state query packet carries an identifier of a multicast group; and when the NVE belongs to a multicast group corresponding to the identifier of the multicast group, sending, by the NVE, a response packet to the network device; and when the NVE does not belong to the multicast group corresponding to the identifier of the multicast group, sending, by the NVE, no response packet to the network device, so that the network device determines that the NVE has left the multicast group corresponding to the identifier of the multicast group, updates the first information and an NVE interface of the multicast group, updates the second information according to the first information, and sends updated second information to the NVO3 manager, so that the NVO3 manager updates a unicast tunnel interface of the multicast group between the network device and the at least one another network device according to the updated second information.

With reference to the second or third possible implementation of the first aspect, in a fifth possible implementation, the method further includes:

receiving, by the NVE, a multicast group state query packet sent by the network device; and sending, by the NVE, a response packet to the network device, where the response packet carries information about each multicast group to which the NVE belongs, so that the network device determines whether it is necessary to update the first information and an NVE interface of each multicast group, update the second information according to the first information, and send updated second information to the NVO3 manager, so that the NVO3 manager updates a unicast tunnel interface of each multicast group between the network device and the at least one another network device according to the updated second information.

According to a second aspect, the present invention provides a method for data transmission, including:

receiving, by a network device, a first multicast protocol packet sent by a network virtualization edge NVE for joining the multicast group, where the first multicast protocol packet carries an identifier of the multicast group;

obtaining, by the network device, first information according to the identifier of the multicast group, establishing an NVE interface of the multicast group according to the first information, and determining second information according to the first information, where the first information includes a correspondence between each NVE connected to the network device and a multicast group to which each NVE belongs, and the second information includes each multicast group in which the network device is involved; and sending, by the network device, the second information to a network virtualization over L3 NVO3 manager, so that the NVO3 manager establishes a unicast tunnel interface of the multicast group between the network device and the at least one another network device according to the second information.

In a first possible implementation of the second aspect, the sending, by the network device, the second information to an NVO3 manager, so that the NVO3 manager establishes a unicast tunnel interface of the multicast group between the network device and the at least one another network device according to the second information includes:

sending, by the network device, the second information to the NVO3 manager; and receiving, by the network device, a unicast tunnel interface configuration instruction that is of the multicast group and sent by the NVO3 manager according to the second information, and establishing the unicast tunnel interface of the multicast group.

In a second possible implementation of the second aspect, the sending, by the network device, the second information to an NVO3 manager, so that the NVO3 manager establishes a unicast tunnel interface of the multicast group between the network device and the at least one another network device according to the second information includes:

sending, by the network device, the second information to the NVO3 manager, so that the NVO3 manager configures a list of unicast tunnels between network devices in the multicast group for a replication point according to the second information, and using the replication point as the unicast tunnel interface of the multicast group between the network device and the at least one another network device.

With reference to the second aspect or the first or second implementation of the second aspect, in a third possible implementation, the method further includes:

receiving, by the network device, a second multicast protocol packet sent by the NVE for joining or leaving a multicast group, where the second multicast protocol packet carries an identifier of the multicast group that the NVE joins or leaves;

updating, by the network device according to the identifier of the multicast group that the NVE joins or leaves, the first information and an NVE interface of the multicast group that the NVE joins or leaves, and updating the second information according to the first information; and sending, by the network device, updated second information to the NVO3 manager, so that the NVO3 manager updates a unicast tunnel interface of the multicast group between the network device and the at least one another network device according to the updated second information.

With reference to any one of the second aspect, the first to third possible implementations of the second aspect, in a fourth possible implementation, the method further includes:

sending, by the network device, a multicast group state query packet to the NVE, where the multicast group state query packet carries an identifier of a multicast group;

when the network device receives no response packet sent by the NVE within a preset time, determining, by the network device, that the NVE has left the multicast group corresponding to the identifier of the multicast group, updating the first information and an NVE interface of the multicast group, and updating the second information according to the first information; and sending, by the network device, updated second information to the NVO3 manager, so that the NVO3 manager updates a unicast tunnel interface of the multicast group between the network device and the at least one another network device according to the updated second information.

With reference to any one of the second aspect, the first to third possible implementations of the second aspect, in a fifth possible implementation, the method further includes:

sending, by the network device, a multicast group state query packet to the NVE;

receiving, by the network device, a response packet sent by the NVE, where the response packet carries information about each multicast group to which the NVE belongs;

when the network device determines that the information about each multicast group to which the NVE belongs changes, updating the first information and an NVE interface of each multicast group, and updating the second information according to the first information; and sending, by the network device, updated second information to the NVO3 manager, so that the NVO3 manager updates a unicast tunnel interface of each multicast group between the network device and the at least one another network device according to the updated second information.

With reference to any one of the second aspect, the first to fifth possible implementations of the second aspect, in a sixth possible implementation, the method further includes:

receiving, by the network device, a first broadcast, unknown unicast and multicast BUM packet that is sent by the NVE and on which multicast tunnel encapsulation is performed, where the first BUM packet on which the multicast tunnel encapsulation is performed carries information about a multicast group corresponding to the first BUM packet, and executing at least one of the following steps:

replicating the first BUM packet to another NVE that belongs to the multicast group and is connected to the network device; and performing unicast tunnel encapsulation on the first BUM packet and replicating the first BUM packet to at least one another network device corresponding to the multicast group through a unicast tunnel interface of the multicast group.

With reference to the sixth implementation of the second aspect, in a seventh possible implementation of the second aspect, the method further includes:

receiving, by the network device through the unicast tunnel interface of the multicast group, a second BUM packet sent by the at least one another network device; and performing, by the network device, unicast tunnel decapsulation on the second BUM packet, and replicating the second BUM packet to an NVE that is connected to the network device and belongs to the multicast group.

According to a third aspect, the present invention provides a method for data transmission, including:

receiving, by a network virtualization over L3 NVO3 manager, second information sent by a network device, where the second information includes a multicast group in which the network device is involved, the second information is determined by the network device according to first information, and the first information includes a correspondence between each NVE connected to the network device and a multicast group to which each NVE belongs; and establishing, by the NVO3 manager, a unicast tunnel interface of the multicast group between the network device and at least one another network device according to the second information.

In a first possible implementation of the third aspect, the establishing, by the NVO3 manager, a unicast tunnel interface of the multicast group between the network device and at least one another network device according to the second information includes:

sending, by the NVO3 manager, a unicast tunnel interface configuration instruction of the multicast group to the network device according to the second information, so that the network device establishes the unicast tunnel interface of the multicast group.

In a second possible implementation of the third aspect, the establishing, by the NVO3 manager, a unicast tunnel interface of the multicast group between the network device and at least one another network device according to the second information includes:

configuring, by the NVO3 manager, a list of unicast tunnels between network devices in the multicast group for a replication point according to the second information, and using the replication point as the unicast tunnel interface of the multicast group between the network device and the at least one another network device.

According to a fourth aspect, the present invention provides a network virtualization edge NVE, including:

an encapsulating module, configured to perform multicast tunnel encapsulation on a first broadcast, unknown unicast and multicast BUM packet to be sent, where the multicast tunnel encapsulation includes adding information for indicating a multicast group to which the first BUM packet belongs to the first BUM packet; and a BUM packet sending module, configured to send the first BUM packet on which the multicast tunnel encapsulation is performed to a network device, so that the network device replicates the first BUM packet to another NVE that belongs to the multicast group and is connected to the network device, and/or that the network device performs unicast tunnel encapsulation on the first BUM packet and replicates the first BUM packet to at least one another network device corresponding to the multicast group through a unicast tunnel interface of the multicast group.

In a first possible implementation of the fourth aspect, the NVE further includes:
- a BUM packet receiving module, configured to receive a second BUM packet sent by the network device, where multicast tunnel encapsulation is performed on the second BUM packet; and
- a parsing module, configured to perform multicast tunnel decapsulation on the second BUM packet, parse the second BUM packet, and send the second BUM packet to a corresponding virtual machine according to information obtained through the parsing.

With reference to the fourth aspect or the first possible implementation of the fourth aspect, in a second possible implementation, the NVE further includes:
- a multicast information sending module, configured to: before the first BUM packet on which the multicast tunnel encapsulation is performed is sent to the network device, or before the NVE receives the second BUM packet sent by the network device, send a first multicast protocol packet for joining the multicast group to the network device, where the first multicast protocol packet carries an identifier of the multicast group, so that the network device obtains first information, adds an NVE interface of the multicast group on the network device according to the first information, determines second information according to the first information, and sends the second information to a network virtualization over L3 NVO3 manager, so that the NVO3 manager establishes the unicast tunnel interface of the multicast group between the network device and at least one another network device according to the second information, where the first information includes a correspondence between each NVE connected to the network device and a multicast group to which each NVE belongs, and the second information includes each multicast group in which the network device is involved.

With reference to the second possible implementation of the fourth aspect, in a third possible implementation, the multicast information sending module is further configured to send a second multicast protocol packet for joining or leaving a multicast group to the network device, where the second multicast protocol packet carries an identifier of the multicast group that the NVE joins or leaves, so that the network device updates, according to the identifier of the multicast group that the NVE joins or leaves, the first information and an NVE interface of the multicast group that the NVE joins or leaves, updates the second information according to the first information, and sends updated second information to the NVO3 manager, so that the NVO3 manager updates the unicast tunnel interface of the multicast group between the network device and the at least one another network device according to the updated second information.

With reference to the second or third possible implementation of the fourth aspect, in a fourth possible implementation, the NVE further includes:
- a query packet receiving module, configured to receive a multicast group state query packet sent by the network device, where the multicast group state query packet carries an identifier of a multicast group; and
- a response module, configured to: when the NVE belongs to a multicast group corresponding to the identifier of the multicast group, send a response packet to the network device; and when the NVE does not belong to the multicast group corresponding to the identifier of the multicast group, send no response packet to the network device, so that the network device determines that the NVE has left the multicast group corresponding to the identifier of the multicast group, updates the first information and an NVE interface of the multicast group, updates the second information according to the first information, and sends updated second information to the NVO3 manager, so that the NVO3 manager updates a unicast tunnel interface of the multicast group between the network device and the at least one another network device according to the updated second information.

With reference to the second or third possible implementation of the fourth aspect, in a fifth possible implementation:
- the query packet receiving module is further configured to receive a multicast group state query packet sent by the network device; and
- the response module is further configured to send a response packet to the network device, where the response packet carries information about each multicast group to which the NVE belongs, so that the network device determines whether it is necessary to update the first information and an NVE interface of each multicast group, update the second information according to the first information, and send updated second information to the NVO3 manager, so that the NVO3 manager updates a unicast tunnel interface of each multicast group between the network device and the at least one another network device according to the updated second information.

According to a fifth aspect, the present invention provides a network device, including:
- a multicast information receiving module, configured to receive a first multicast protocol packet sent by a network virtualization edge NVE for joining the multicast group, where the first multicast protocol packet carries an identifier of the multicast group that the NVE joins;
- a multicast information obtaining module, configured to obtain first information according to the identifier of the multicast group, establish an NVE interface of the multicast group according to the first information, and determine second information according to the first information, where the first information includes a correspondence between each NVE connected to the network device and a multicast group to which each NVE belongs, and the second information includes each multicast group in which the network device is involved; and
- a second information sending module, configured to send the second information to a network virtualization over L3 NVO3 manager, so that the NVO3 manager establishes the unicast tunnel interface of the multicast group between the network device and the at least one another network device according to the second information.

In a first possible implementation of the fifth aspect, the second information sending module is specifically configured to:
send the second information to the NVO3 manager; and
the network device further includes: an instruction receiving module, configured to receive a unicast tunnel interface configuration instruction that is of the multicast group and sent by the NVO3 manager according to the second information, and establish the unicast tunnel interface of the multicast group.

In a second possible implementation of the fifth aspect, the second information sending module is specifically configured to:

send the second information to the NVO3 manager, so that the NVO3 manager configures a list of unicast tunnels between network devices in the multicast group for a replication point according to the second information, and use the replication point as the unicast tunnel interface of the multicast group between the network device and the at least one another network device.

With reference to any one of the fifth aspect, the first or second possible implementations of the fifth aspect, in a third possible implementation, the multicast information receiving module is further configured to:

receive a second multicast protocol packet sent by the NVE for joining or leaving a multicast group, where the second multicast protocol packet carries an identifier of the multicast group that the NVE joins or leaves;

the multicast information obtaining module is further configured to update, according to the identifier of the multicast group that the NVE joins or leaves, the first information and an NVE interface of the multicast group that the NVE joins or leaves, and update the second information according to the first information; and the second information sending module is further configured to send updated second information to the NVO3 manager, so that the NVO3 manager updates a unicast tunnel interface of the multicast group between the network device and the at least one another network device according to the updated second information.

With reference to any one of the fifth aspect, the first or second possible implementations of the fifth aspect, in a fourth possible implementation, the network device further includes:

a first multicast information query module, configured to send a multicast group state query packet to the NVE, where the multicast group state query packet carries an identifier of a multicast group;

the multicast information obtaining module is further configured to: when no response packet sent by the NVE is received within a preset time, determine that the NVE has left a multicast group corresponding to the identifier of the multicast group, update the first information and an NVE interface of the multicast group, and update the second information according to the first information; and the second information sending module is further configured to send updated second information to the NVO3 manager, so that the NVO3 manager updates a unicast tunnel interface of the multicast group between the network device and the at least one another network device according to the updated second information.

With reference to any one of the fifth aspect, the first to third possible implementations of the fifth aspect, in a fifth possible implementation, the network device further includes:

a second multicast information query module, configured to send a multicast group state query packet to the NVE;

the multicast information receiving module is further configured to receive a response packet sent by the NVE, where the response packet carries information about each multicast group to which the NVE belongs;

the multicast information obtaining module is further configured to: when determining that the information about each multicast group to which the NVE belongs changes, update the first information and an NVE interface of each multicast group, and update the second information according to the first information; and the second information sending module is further configured to send updated second information to the NVO3 manager, so that the NVO3 manager updates a unicast tunnel interface of each multicast group between the network device and the at least one another network device according to the updated second information.

With reference to any one of the fifth aspect, the first to fifth possible implementations of the fifth aspect, in a sixth possible implementation, the network device further includes:

a BUM packet receiving module, configured to receive a first broadcast, unknown unicast and multicast BUM packet that is sent by the NVE and on which multicast tunnel encapsulation is performed, where the first BUM packet on which the multicast tunnel encapsulation is performed carries information about a multicast group corresponding to the first BUM packet; and a BUM packet transmitting module, configured to replicate the first BUM packet to another NVE that belongs to the multicast group and is connected to the network device; and/or perform unicast tunnel encapsulation on the first BUM packet and replicate the first BUM packet to at least one another network device corresponding to the multicast group through a unicast tunnel interface of the multicast group.

With reference to the sixth possible implementations of the fifth aspect, in a seventh possible implementation of the fifth aspect, the BUM packet receiving module is further configured to receive, through the unicast tunnel interface of the multicast group, a second BUM packet sent by the at least one another network device; and the BUM packet transmitting module is further configured to perform unicast tunnel decapsulation on the second BUM packet, and replicate the second BUM packet to an NVE that is connected to the network device and belongs to the multicast group.

According to a sixth aspect, the present invention provides a network virtualization over L3 NVO3 manager, including:

a second information receiving module, configured to receive second information sent by a network device, where the second information includes a multicast group in which the network device is involved, the second information is determined by the network device according to first information, and the first information includes a correspondence between each NVE connected to the network device and a multicast group to which each NVE belongs; and a multicast-group unicast tunnel interface establishing module, configured to establish a unicast tunnel interface of the multicast group between the network device and at least one another network device according to the second information.

In a first possible implementation of the sixth aspect, the multicast-group unicast tunnel interface establishing module is specifically configured to:

send a unicast tunnel interface configuration instruction of the multicast group to the network device according to the second information, so that the network device establishes the unicast tunnel interface of the multicast group.

In a second possible implementation of the sixth aspect, the multicast-group unicast tunnel interface establishing module is specifically configured to:

configure a list of unicast tunnels between network devices in the multicast group for a replication point according to the second information, and use the replication point as the unicast tunnel interface of the multicast group between the network device and the at least one another network device.

According to a seventh aspect, the present invention provides a system for data transmission, including: the network virtualization edge NVE according to the fourth aspect or any one possible implementation of the fourth aspect, the network device according to the fifth aspect or any one possible implementation of the fifth aspect, and the network virtualization over L3 NVO3 manager according to the sixth aspect or any one possible implementation of the sixth aspect.

According to the method, the apparatus, and the system for data transmission of the present invention, an NVE performs multicast tunnel encapsulation on a first BUM packet to be sent, which implements adding information for indicating a multicast group to which the first BUM packet belongs to the first BUM packet; then, the NVE sends the first BUM packet to a network device, so that the network device replicates the first BUM packet to another NVE that belongs to the multicast group and is connected to the network device, or that the network device performs unicast tunnel encapsulation on the first BUM packet and replicates the first BUM packet to at least one another network device corresponding to the multicast group through a unicast tunnel interface of the multicast group. In a solution according to the embodiments, because the network device sends the BUM packet to the at least one another network device corresponding to the multicast group through the unicast tunnel interface of the multicast group, that is, sends the BUM packet still in a unicast manner, an original design of the network device is met, and the network device does not need to be modified to support bidirectional multicast transmission. Therefore, an implementation cost may be reduced.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

A host involved in the embodiments of the present invention may be a computer or a server. An NVE involved in the embodiments of the present invention may be a device that has functions of a switch and is implemented by using software in a computer, such as a virtual switch vSwitch, and may also be an independent hardware device, such as a switch, a router, or directly a computer or server. A network device involved in the embodiments of the present invention may be a switch or router, which may also be referred to as a top-of-rack switch (Top of Rack, TOR for short) in an NVO3 network. In some special scenarios, for example, in a network in which only one VM or one host is connected to an NVE, the NVE, a network device, and the VM or host connected to the NVE may be integrated on a same hardware device. An NVO3 manager involved in the embodiments of the present invention may be a server in a network. A replication point involved in the embodiments of the present invention may be a switch or router. A BUM packet involved in the embodiments of the present invention may be an Ethernet packet generated by a VM or host, and multicast tunnel encapsulation or unicast tunnel encapsulation needs to be performed when the BUM packet is transmitted in a virtual network. In the embodiments of the present invention, the BUM packet needs to be replicated to all other VMs or hosts belonging to a same multicast group as the VM or host. For convenience of description, the VM or host that generates the BUM packet is referred to as a source VM or source host.

Figure 1:
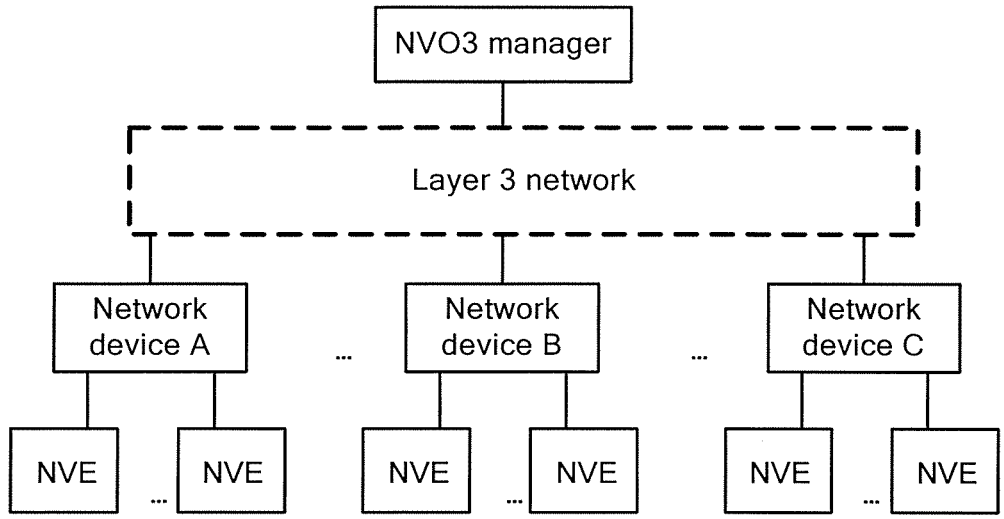
FIG. 1 is a diagram of a network architecture corresponding to a method for data transmission according to the present invention.

FIG. 1 is a diagram of a network architecture corresponding to a method for data transmission according to the present invention. As shown in FIG. 1, a network according to an embodiment may include NVEs, network devices, and an NVO3 manager, where each NVE may be connected to at least one VM or host, each network device may be connected to at least one NVE, the network devices are connected to each other by using a Layer 3 network, data transmission may be performed between the NVEs and the network devices, and data transmission may be performed between the network devices by using a unicast tunnel. A plurality of multicast groups may exist in the network, where each multicast group includes at least two VMs or hosts; and the VMs or hosts in each multicast group may be connected to a same NVE or different NVEs, and may also be connected to a same network device or different network devices. The network architecture shown in FIG. 1 is applicable to a method for data transmission according to embodiments shown in FIG. 2, FIG. 3, FIG. 4, FIG. 5, and FIG. 7.

Figure 2:
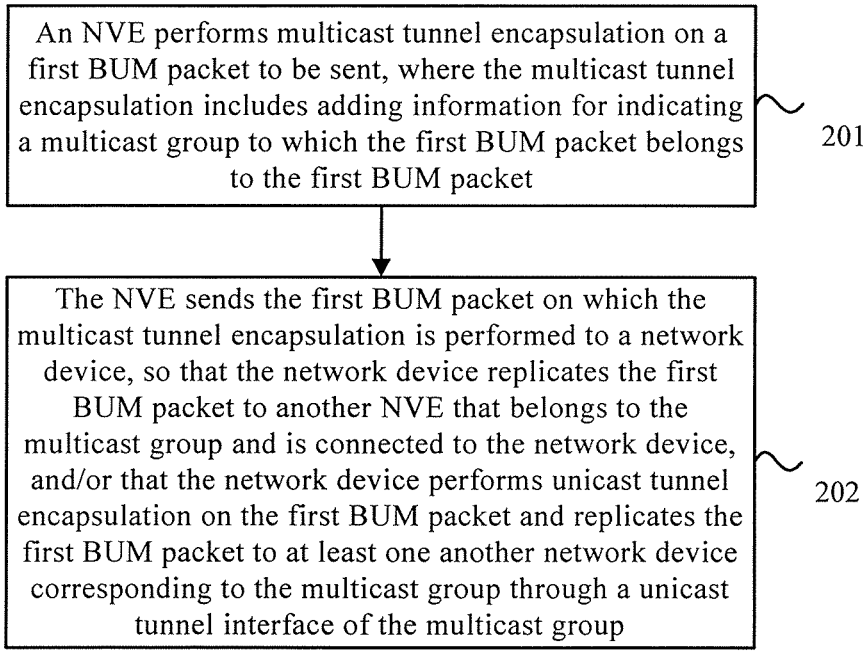
FIG. 2 is a flowchart of a method for data transmission according to Embodiment 1 of the present invention.

FIG. 2 is a flowchart of a method for data transmission according to Embodiment 1 of the present invention, where an execution body of this embodiment is an NVE. As shown in FIG. 2, the method according to this embodiment may include the following:

Step 201: The NVE performs multicast tunnel encapsulation on a first BUM packet to be sent, where the multicast tunnel encapsulation includes adding information for indicating a multicast group to which the first BUM packet belongs to the first BUM packet.

The first BUM packet is sent by a source VM or source host connected to the NVE, and the first BUM packet needs to be replicated to all other VMs or hosts belonging to a same multicast group as the source VM or source host. VMs or hosts belonging to a same multicast group may be VMs or hosts having a same VNI, or VMs or hosts having a same VSID. A multicast group may also be allocated in another manner. For example, one multicast group may be allocated to a plurality of VNIs or VSIDs, or different multicast groups may be allocated to different packets with a same VSID.

That the NVE performs encapsulation on the first BUM packet may specifically be adding a packet header including the information about the multicast group to which the NVE belongs to the first BUM packet.

Step 202: The NVE sends the first BUM packet on which the multicast tunnel encapsulation is performed to a network device, so that the network device replicates the first BUM packet to another NVE that belongs to the multicast group and is connected to the network device, and/or that the network device performs unicast tunnel encapsulation on the first BUM packet and replicates the first BUM packet to at least one another network device corresponding to the multicast group through a unicast tunnel interface of the multicast group.

Specifically, before the first BUM packet is transmitted between the NVE and the network device, an NVE interface of the multicast group already exists on the network device, where the NVE interface of the multicast group is an NVE interface that is added to each multicast group by the network device according to information indicating a multicast group to which each NVE connected to the network device belongs. In addition, a unicast tunnel interface of a multicast group between the network device and the at least one another network device already exists on the network device. For example, a unicast tunnel interface for a multicast group is set on all network devices corresponding to the same multicast group.

In the network architecture shown in FIG. 1, for example, an NVE belonging to a first multicast group exists on each of network devices marked as A, B, and C, or in other words, at least one NVE belonging to the first multicast group exists on each of the network devices A, B, and C; each NVE is connected to a VM or host belonging to the first multicast group; accordingly, when receiving a BUM packet sent by an NVE of a source VM or source host belonging to the first multicast group, the network device A needs to replicate the BUM packet to the network device B and the network device C.

Generally, multicast is not deployed on an existing network; therefore, in the prior art, a network device needs to be modified to support multicast transmission. In addition, because NVEs and network devices are mutually equal, that is, each network device may send data and receive data, the network device needs to be modified to support bidirectional multicast transmission, that is, protocol-independent multicast-bidirection (PIM-BIDIR). This solution is difficult to perform and an implementation cost is high.

During specific implementation of this embodiment, an implementation is configuring a unicast tunnel interface of a multicast group on each network device. For example, a unicast tunnel interface of the first multicast group may be configured on each of the network devices A, B, and C. When encapsulation is performed by an NVE on a BUM packet from a VM or host of the first multicast group, information indicating that the BUM packet belongs to the first multicast group may be included in a packet header. Therefore, after the BUM packet is sent to a network device (assuming that the network device is the network device A), the BUM packet may be replicated, through a unicast tunnel and according to the information that is about the first multicast group and is included in the packet header, to a network device having a unicast tunnel interface of the first multicast group, that is, be replicated to the network device B and the network device C; and then the network device B and the network device C replicate the BUM packet respectively to NVEs that are connected to the network device B and the network device C respectively and belong to the first multicast group.

In another implementation, a replication point may be further disposed on a basis of the network architecture shown in FIG. 1, where the replication point may be disposed between the NVO3 manager and the network devices, and the replication point is used as a relay point and is used as a unicast tunnel interface of a multicast group; an interface of the multicast group no longer needs to be configured on each network device. Specifically, a list of unicast tunnels between network devices in each multicast group may be configured on the replication point; after receiving a BUM packet sent by an NVE, each network device only needs to perform unicast tunnel encapsulation on the BUM packet and send the BUM packet to the replication point; the replication point sends the BUM packet to at least one another network device of a multicast group corresponding to the BUM packet according to the list of the unicast tunnels between the network devices in each multicast group. In the foregoing example, after an NVE connected to the network device A sends a BUM packet on which multicast tunnel encapsulation is performed to the network device A, the network device A performs unicast tunnel encapsulation on the BUM packet and sends the BUM packet to the replication point; the replication point learns, according to a packet header in the BUM packet, that a multicast group corresponding to the BUM packet is the first multicast group, and then learns, according to a list of unicast tunnels between network devices in each multicast group, that network devices corresponding to the first multicast group are the network devices A, B, and C. Because the network device A is the network device that sends the BUM packet, when replicating the BUM packet, the replication point excludes the network device A, and replicates the BUM packet to the network devices B and C.

Further, after receiving the first BUM packet, another NVE of the multicast group may perform multicast tunnel decapsulation on the first BUM packet, parse the first BUM packet, and send the first BUM packet to a corresponding virtual machine according to information obtained through the parsing.

Because NVEs are equal, the NVE that is used as the execution body of this embodiment may also receive a BUM packet sent by a network device connected to the NVE. For clearer description, in this embodiment of the present invention, a BUM packet sent by an NVE to a network device is referred to as a first BUM packet, and a BUM packet that is sent by the network device connected to the NVE and received by the NVE is referred to as a second BUM packet. After the NVE receives the second BUM packet sent by the network device connected to the NVE, the NVE performs multicast tunnel decapsulation on the second BUM packet, parses the second BUM packet, and sends the second BUM packet to a corresponding VM or host according to information obtained through the parsing.

After receiving the first BUM packet, the at least one another network device may perform unicast tunnel encapsulation on the first BUM packet and replicate the first BUM packet to an NVE belonging to the multicast group; then, the NVE performs multicast tunnel decapsulation on the first BUM packet, parses the first BUM packet, and sends the first BUM packet to a corresponding virtual machine or host according to information obtained through the parsing.

In this embodiment, an NVE performs multicast tunnel encapsulation on a first BUM packet to be sent, which implements that a packet header of the first BUM packet carries information about a multicast group of the BUM packet; then, the NVE sends the first BUM packet to a network device, so that the network device replicates the first BUM packet to another NVE that belongs to the multicast group and is connected to the network device, or that the network device performs unicast tunnel encapsulation on the first BUM packet and replicates the first BUM packet to the at least one another network device corresponding to the multicast group through a unicast tunnel interface of the multicast group. In the solution according to this embodiment, because the network device sends the BUM packet to the at least one another network device corresponding to the multicast group through the unicast tunnel interface of the multicast group, that is, sends the BUM packet still in a unicast manner, an original design of the network device is met, and the network device does not need to be modified to support bidirectional multicast transmission. Therefore, an implementation cost may be reduced.

In addition, in the prior art, because when performing NVO3 encapsulation on an Ethernet packet, the NVE needs to learn a binding relationship between a VM or host at a destination address and the NVE, an NVO3 manager needs to be interconnected with a VM manager (VMM) and obtain VM-related information from the VMM, so as to learn a distribution condition of VMs/hosts of each VNI on each NVE. Generally, the NVO3 manager and the VMM are provided by different vendors, and their interfaces are inconsistent with each other; therefore, it is difficult to interconnect the NVO3 manager with the VMM, so that this solution is difficult to implement. In this embodiment, the NVO3 manager does not need to be interconnected with a VMM, which may avoid a problem that the solution is difficult to implement due to difficulty in interconnecting the NVO3 manager with the VMM.

Further, before the sending, by the NVE, the first BUM packet on which the multicast tunnel encapsulation is performed to the network device, or before the receiving, by the NVE, the second BUM packet sent by the network device, the method according to the foregoing embodiment may further include the following step of enabling the network device to establish the NVE interface of the multicast group and the unicast tunnel interface of the multicast group:

sending, by the NVE, a first multicast protocol packet for joining the multicast group to the network device, where the first multicast protocol packet carries an identifier of the multicast group, so that the network device obtains first information, adds the NVE interface of the multicast group on the network device according to the first information, determines second information according to the first information, and sends the second information to a network virtualization over L3 NVO3 manager, so that the NVO3 manager establishes the unicast tunnel interface of the multicast group between the network device and the at least one another network device according to the second information, where the first information includes a correspondence between each NVE connected to the network device and a multicast group to which each NVE belongs, and the second information includes each multicast group in which the network device is involved.

Further, the method according to the foregoing embodiment may further include the following step of updating a multicast tunnel and updating a multicast interface of the unicast tunnel:

sending, by the NVE, a second multicast protocol packet for joining or leaving a multicast group to the network device, where the second multicast protocol packet carries an identifier of the multicast group that the NVE joins or leaves, so that the network device updates, according to the identifier of the multicast group that the NVE joins or leaves, the first information and an NVE interface of the multicast group, updates the second information according to the first information, and sends the second information to the NVO3 manager, so that the NVO3 manager updates the unicast tunnel interface of the multicast group between the network device and the at least one another network device according to the updated second information.

It may be understood that, because the second information includes the multicast group in which the network device is involved, when a first NVE of a multicast group joins or a last NVE of a multicast group leaves, the second information changes. Therefore, a moment for the network device to update the second information and send the updated second information to the NVO3 manager is when a first NVE of a multicast group joins or when a last NVE of a multicast group leaves. Seen from a perspective of the network device, that a first NVE of a multicast group joins may be establishing a first NVE interface of the multicast group, and that a last NVE of a multicast group leaves may be deleting a last NVE interface of the multicast group.

Further, during specific implementation, it is possible that, when leaving a multicast group, some NVEs do not send a second multicast protocol packet for leaving the multicast group to the network device. In this case, the network device may perform multicast group query on each NVE according to a preset time period. The multicast group query may be performed in two manners. One is specific group query, where information about members of a specific multicast group is queried and an identifier of the multicast group to be queried is carried in a packet; the other is general group query, where information about members of all multicast groups is queried and a packet does not include an identifier of a multicast group to be queried. The following describes the two manners of multicast group query in detail.

In the manner of specific group query, the network device sends a multicast group state query packet to an NVE, where the multicast group state query packet carries an identifier of a multicast group. When the NVE belongs to a multicast group corresponding to the identifier of the multicast group, the NVE sends a response packet to the network device. In this case, the network device may determine that the NVE still belongs to the multicast group, and therefore does not need to update information about the multicast group. When the network device receives no response packet sent by the NVE within a preset time, the network device determines that the NVE has left the multicast group corresponding to the identifier of the multicast group, updates the first information and the NVE interface of the multicast group, updates the second information according to the first information, and sends updated second information to the NVO3 manager, so that the NVO3 manager updates the unicast tunnel interface of the multicast group between the network device and the at least one another network device according to the updated second information.

In the manner of general group query, the network device may send a multicast group state query packet to an NVE according to a preset time period; the NVE sends a response packet to the network device, where the response packet carries information about each multicast group to which the NVE belongs, so that the network device determines whether the first information needs to be updated. When determining that the information that is about each multicast group to which the NVE belongs and is carried in the response packet is different from the first information, the network device updates the first information and an NVE interface of each multicast group, updates the second information according to the first information, and sends updated second information to the NVO3 manager, so that the NVO3 manager updates a unicast tunnel interface of each multicast group between the network device and the at least one another network device according to the updated second information.

Figure 3:
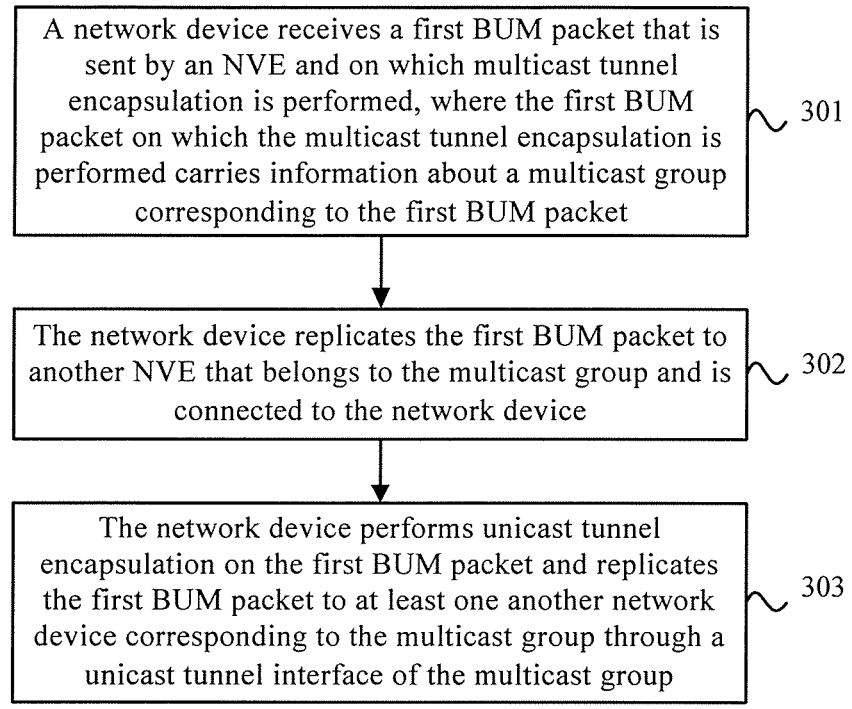
FIG. 3 is a flowchart of a method for data transmission according to Embodiment 2 of the present invention.

FIG. 3 is a flowchart of a method for data transmission according to Embodiment 2 of the present invention, where an execution body of this embodiment is a network device. As shown in FIG. 3, the method according to this embodiment may include the following:

Step 301: The network device receives a first BUM packet that is sent by an NVE and on which multicast tunnel encapsulation is performed, where the first BUM packet on which the multicast tunnel encapsulation is performed carries information about a multicast group corresponding to the first BUM packet.

The first BUM packet is sent by a source VM or source host connected to the NVE, and the first BUM packet needs to be replicated to all other VMs or hosts belonging to a same multicast group as the source VM or source host. VMs or hosts belonging to a same multicast group may be VMs or hosts having a same VNI, or VMs or hosts having a same VSID.

A packet header of the first BUM packet on which the multicast tunnel encapsulation is performed carries the information about the multicast group corresponding to the first BUM packet.

Step 302: The network device replicates the first BUM packet to another NVE that belongs to the multicast group and is connected to the network device.

Specifically, NVE interfaces of the multicast group that are established according to the multicast group already exist between the NVE and the network device, and between the another NVE of the multicast group and the network device.

Step 302 is optional. Because the network device may be connected to a plurality of NVEs, if an NVE belonging to the multicast group corresponding to the first BUM packet exists among other NVEs connected to the network device, step 302 is executed; and if no NVE belonging to the multicast group corresponding to the first BUM packet is connected to the network device, step 302 is not executed.

Step 303: The network device performs unicast tunnel encapsulation on the first BUM packet and replicates the first BUM packet to at least one another network device corresponding to the multicast group through a unicast tunnel interface of the multicast group.

Step 302 and step 303 have no sequential relationship, and step 303 may also be executed before step 302.

Specifically, the unicast tunnel interface of the multicast group already exists between the network device and the at least one another network device.

Because a common network device support unicast transmission, in the prior art, a network device needs to be modified to support multicast transmission. In addition, because NVEs and network devices are mutually equal, that is, each network device may send data and receive data, the network device needs to be modified to support bidirectional multicast transmission. This solution is difficult to perform and an implementation cost is high.

During specific implementation of this embodiment, an implementation is configuring a unicast tunnel interface of a multicast group on each network device. For example, an interface of a first multicast group may be configured on network devices A, B, and C. When encapsulation is performed by the NVE on a packet from a VM or host of the first multicast group, a packet header may include information about the first multicast group. Therefore, after the BUM packet is sent to a network device (assuming that the network device is the network device A), the network device may replicate, through a unicast tunnel and according to the information that is about the first multicast group and included in the packet header, the BUM packet to network devices having interfaces of the first multicast group, for example, the network device B and the network device C.

In another implementation, a replication point may be further disposed on the basis of the network architecture shown in FIG. 1, where the replication point may be disposed between an NVO3 manager and the network devices, and the replication point is used as the unicast tunnel interface of the multicast group and is used as a relay point for transmitting a BUM packet; the unicast tunnel interface of the multicast group no longer needs to be configured on each network device. Specifically, information about a multicast group in which each network device is involved may be configured on the replication point. For example, a list of unicast tunnels between network devices in each multicast group may be configured for the replication point; after receiving the BUM packet sent by the NVE, each network device only needs to perform unicast tunnel encapsulation on the BUM packet and send the BUM packet to the replication point; the replication point sends the BUM packet to at least one another network device of the multicast group according to the list of the unicast tunnels between the network devices in each multicast group. In the foregoing example, after an NVE connected to the network device A sends a BUM packet on which multicast tunnel encapsulation is performed to the network device A, the network device A performs unicast tunnel encapsulation on the BUM packet and sends the BUM packet to the replication point; the replication point learns, according to a packet header in the BUM packet, that a multicast group corresponding to the BUM packet is the first multicast group, and then learns, according to a list of unicast tunnels between network devices in the multicast group, that network devices corresponding to the first multicast group are the network devices A, B, and C. Because the network device A is the network device that sends the BUM packet, when replicating the BUM packet, the replication point excludes the network device A, and replicates the BUM packet to the network devices B and C.

Further, after step 303, after receiving the first BUM packet, the at least one another network device may perform unicast tunnel decapsulation on the first BUM packet, and send the first BUM packet to an NVE that is connected to the at least one another network device and belongs to the multicast group; the NVE that receives the first BUM packet then performs multicast tunnel decapsulation on the first BUM packet, parses the first BUM packet, and sends the first BUM packet to a corresponding VM or host according to information obtained through the parsing.

Because the network devices are equal, the network device that is used as the execution body of this embodiment may also receive, through the unicast tunnel interface of the multicast group, a second BUM packet sent by the at least one another network device, and may perform unicast tunnel decapsulation on the second BUM packet and send the second BUM packet to an NVE that is connected to the network device and belongs to the multicast group; the NVE that receives the second BUM packet then performs multicast tunnel decapsulation on the second BUM packet, parses the second BUM packet, and sends the second BUM packet to a corresponding VM or host according to information obtained through the parsing.

In this embodiment, after receiving a first BUM packet that is sent by an NVE and on which multicast tunnel encapsulation is performed, a network device replicates the first BUM packet to another NVE of a multicast group according to information that is about the multicast group and carried in the first BUM packet, and/or performs unicast tunnel encapsulation on the first BUM packet and replicates the first BUM packet to at least one another network device corresponding to the multicast group through a unicast tunnel interface of the multicast group. In a solution according to this embodiment, because the network device sends the first BUM packet to the at least one another network device corresponding to the multicast group through the unicast tunnel interface of the multicast group, that is, sends the BUM packet still in a unicast manner, an original design of the network device is met, and the network device does not need to be modified to support bidirectional multicast transmission. Therefore, an implementation cost may be reduced.

Further, before the network device receives the first BUM packet that is sent by the NVE and on which the multicast tunnel encapsulation is performed, the method according to the foregoing embodiment further includes the following steps of establishing a multicast tunnel and establishing the unicast tunnel interface of the multicast group:

Step 1: The network device receives a first multicast protocol packet sent by the NVE for joining the multicast group, where the first multicast protocol packet carries an identifier of the multicast group that the NVE joins.

Step 2: The network device obtains first information according to the identifier of the multicast group that the NVE joins, establishes an NVE interface of the multicast group according to the first information, and determines second information according to the first information, where the first information includes a correspondence between each NVE connected to the network device and a multicast group to which each NVE belongs, and the second information includes each multicast group in which the network device is involved. Step 3: The network device sends the second information to a network virtualization over L3 NVO3 manager, so that the NVO3 manager establishes the unicast tunnel interface of the multicast group between the network device and the at least one another network device according to the second information.

Further, a first possible implementation of the foregoing step 3 may be that, after sending the second information to the NVO3 manager, the network device receives a unicast tunnel interface configuration instruction that is of the multicast group and sent by the NVO3 manager according to the second information, and establishes the unicast tunnel interface of the multicast group.

Further, a second possible implementation of the foregoing step 3 may be that, the network device sends the second information to the NVO3 manager, so that the NVO3 manager configures a list of unicast tunnels between network devices in each multicast group for a replication point according to the second information, and uses the replication point as the unicast tunnel interface of the multicast group between the network device and the at least one another network device.

Further, the method according to the foregoing embodiment may further include the following steps of updating a multicast tunnel and updating a multicast interface of the unicast tunnel:

Step 1: The network device receives a second multicast protocol packet sent by the NVE for joining or leaving a multicast group, where the second multicast protocol packet carries an identifier of the multicast group that the NVE joins or leaves.

Step 2: The network device updates the first information and an NVE interface of the multicast group according to the identifier of the multicast group that the NVE joins or leaves, and updates the second information according to the first information.

Step 3: The network device sends the updated second information to the NVO3 manager, so that the NVO3 manager updates a unicast tunnel interface of the multicast group between the network device and the at least one another network device according to the updated second information.

It may be understood that, because the second information includes the multicast group in which the network device is involved, when a first NVE of a multicast group joins or a last NVE of a multicast group leaves, the second information changes. Therefore, a moment for the network device to update the second information and send the second information to the NVO3 manager is when a first NVE of a multicast group joins or when a last NVE of a multicast group leaves. Seen from a perspective of the network device, that a first NVE of a multicast group joins may be establishing a first NVE interface of the multicast group, and that a last NVE of a multicast group leaves may be deleting a last NVE interface of the multicast group.

Further, during specific implementation, it is possible that, when leaving a multicast group, some NVEs do not send a second multicast protocol packet for leaving the multicast group to the network device. In this case, the network device may perform multicast group query on each NVE according to a preset time period. The multicast group query may be performed in two manners. One is specific group query, where information about members of a specific multicast group is queried and an identifier of the multicast group to be queried is carried in a packet; the other is general group query, where information about members of all multicast groups is queried and a packet does not include an identifier of a multicast group to be queried. Reference may be made to the foregoing description for specific content of the two manners of multicast group query, which is not described herein again.

Figure 4:
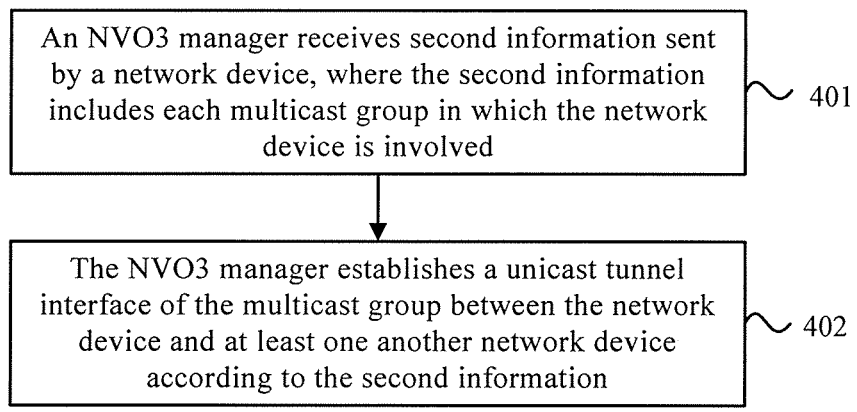
FIG. 4 is a flowchart of a method for data transmission according to Embodiment 3 of the present invention.

FIG. 4 is a flowchart of a method for data transmission according to Embodiment 3 of the present invention, where an execution body of this embodiment is an NVO3 manager. The NVO3 manager itself does not participate in a process of data transmission, and is used to establish a unicast tunnel interface of a multicast group for a network device and at least one another network device according to second information. As shown in FIG. 4, the method according to this embodiment may include the following:

Step 401: The NVO3 manager receives second information sent by a network device, where the second information includes a multicast group in which the network device is involved.

Step 402: The NVO3 manager establishes a unicast tunnel interface of the multicast group between the network device and at least one another network device according to the second information.

Further, in a specific implementation, an implementation of step 402 may be:

sending, by the NVO3 manager, a unicast tunnel interface configuration instruction of the multicast group to the network device according to the second information, so that the network device establishes the unicast tunnel interface of the multicast group.

Specifically, the NVO3 manager may determine, according to the second information, network devices involved in each multicast group, and then, based on each multicast group, configure a unicast tunnel interface reaching at least one another network device involved in the multicast group for each network device, where the unicast tunnel interface may be, for example, an IP address of the at least one another network device involved in the multicast group.

Alternatively, another implementation of step 402 may be:

configuring, by the NVO3 manager, a list of unicast tunnels between network devices in each multicast group for a replication point according to the second information, and using the replication point as the unicast tunnel interface of the multicast group between the network device and the at least one another network device.

Specifically, the NVO3 manager may determine, according to the second information, network devices involved in each multicast group; then, based on distribution of each multicast group on network devices, configure a list of unicast tunnels between network devices in each multicast group for the replication point, where the list may include IP addresses of all the network devices involved in each multicast group; and use the replication point as the unicast tunnel interface of the multicast group between the network devices, and use the replication point as a relay point for transmitting a BUM packet. That is, when receiving a BUM packet, the network device performs unicast tunnel encapsulation on the BUM packet and sends the BUM packet to the replication point; the replication point finds, according to a list of unicast tunnels between network devices in the multicast group, network devices that are involved in a multicast group corresponding to the BUM packet, and replicates the BUM packet to involved network devices according to the list of the unicast tunnels between the network devices in the multicast group.

During specific implementation, when the second information changes, the network device may send updated second information to the NVO3 manager. In this case, the NVO3 manager may update the unicast tunnel interface of the multicast group between the network device and the at least one another network device according to the updated second information.

In this embodiment, an NVO3 manager establishes a unicast tunnel interface of a multicast group between a network device and at least one another network device according to second information, so that the network device may perform, after receiving a BUM packet that is sent by an NVE and on which multicast tunnel encapsulation is performed, unicast tunnel encapsulation on the BUM packet, and replicate, according to information that is about the multicast group and carried in the BUM packet, the BUM packet to at least one another network device corresponding to the multicast group through a unicast tunnel interface of the multicast group. In a solution according to this embodiment, because the network device can send the BUM packet to the at least one another network device corresponding to the multicast group through the unicast tunnel interface of the multicast group, that is, send the BUM packet still in a unicast manner, an original design of the network device is met, and the network device does not need to be modified to support bidirectional multicast transmission. Therefore, an implementation cost may be reduced.

Figure 5:
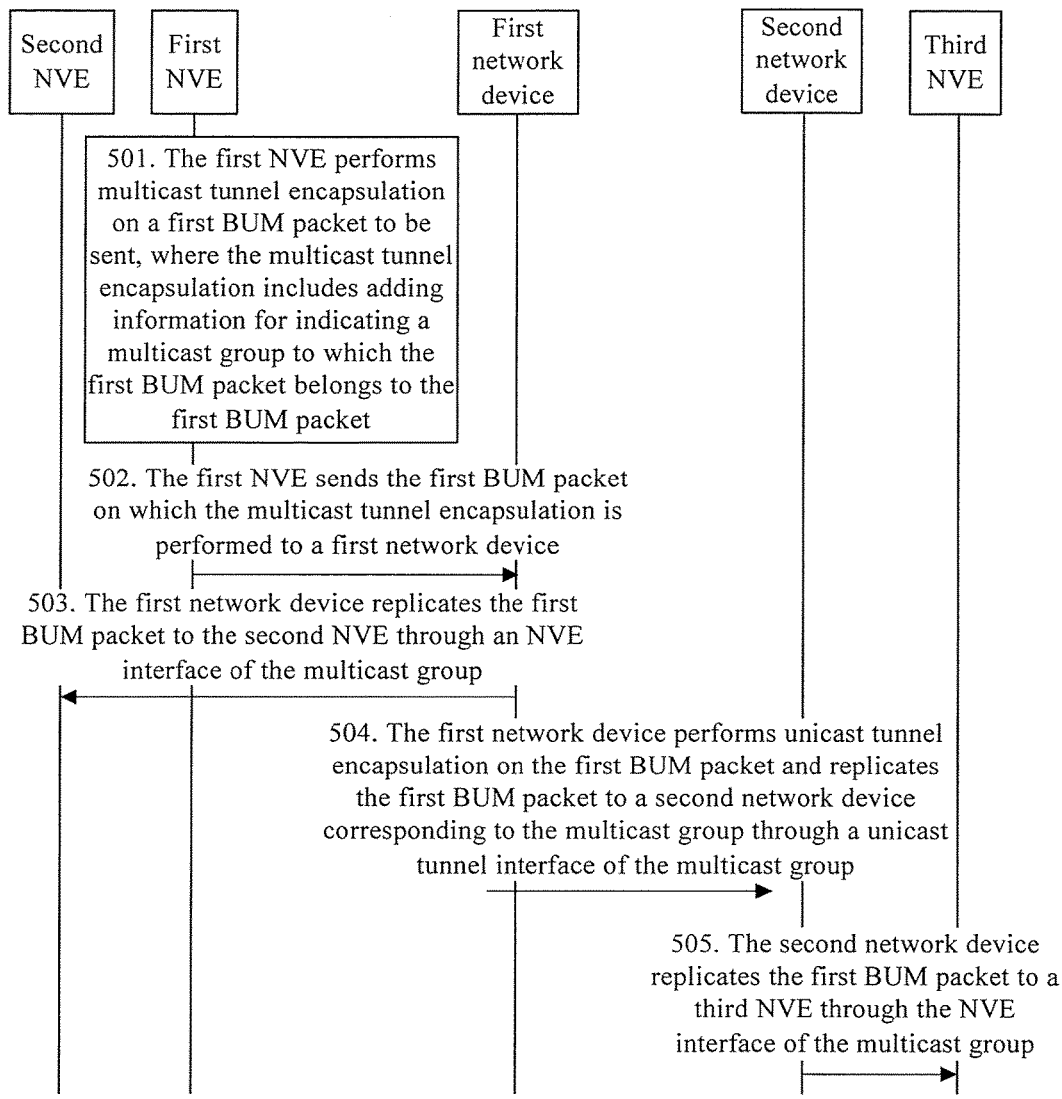
FIG. 5 is a signaling flowchart of a method for data transmission according to Embodiment 4 of the present invention.

FIG. 5 is a signaling flowchart of a method for data transmission according to Embodiment 4 of the present invention. In this embodiment, a process of interaction between an NVE, a network device, and an NVO3 manager is described. The network architecture shown in FIG. 1 may be used in this embodiment, where there may be a plurality of NVEs and network devices. For convenience of description, in this embodiment, interaction between a first network device and a second network device, and between the first network device and the second network device and NVEs connected to the first network device and the second network device is used as an example. It is assumed that both the first network device and the second network device belong to a first multicast group, a first NVE and a second NVE are connected to the first network device, a third NVE and a fourth NVE (not shown in the figure) are connected to the second network device, and the first NVE, the second NVE, and the third NVE belong to the first multicast group. In this embodiment, it is assumed that both a multicast tunnel and a unicast tunnel interface of a multicast group have been configured. As shown in FIG. 5, the method according to this embodiment may include the following:

Step 501: The first NVE performs multicast tunnel encapsulation on a first BUM packet to be sent, where the multicast tunnel encapsulation includes adding information for indicating a multicast group to which the first BUM packet belongs to the first BUM packet.

Because the first NVE belongs to the first multicast group, in step 501, the first NVE may add an identifier of the first multicast group to a packet header of the first BUM packet.

Step 502: The first NVE sends the first BUM packet on which the multicast tunnel encapsulation is performed to the first network device.

Step 503: The first network device replicates the first BUM packet to the second NVE through an NVE interface of the multicast group.

Specifically, the first network device determines, according to the packet header in the first BUM packet, that a multicast group corresponding to the first BUM packet is the first multicast group; then determines that among NVEs connected to the first network device, except the first NVE, an NVE belonging to the first multicast group is the second NVE; and therefore replicates the BUM packet to the second NVE.

It should be noted that step 503 is optional. If no other NVE among the NVEs connected to the first network device except the first NVE belongs to the first multicast group, step 503 does not need to be executed.

Step 504: The first network device performs unicast tunnel encapsulation on the first BUM packet and replicates the first BUM packet to the second network device corresponding to the multicast group through the unicast tunnel interface of the multicast group.

Specifically, a possible implementation may be that, the first network device determines, according to the packet header in the first BUM packet, that the multicast group corresponding to the first BUM packet is the first multicast group; then determines, according to the unicast tunnel interface of the multicast group, that a network device belonging to the first multicast group among other network devices connected to the first network device is the second network device; and therefore replicates the first BUM packet to the second network device.

Figure 6:
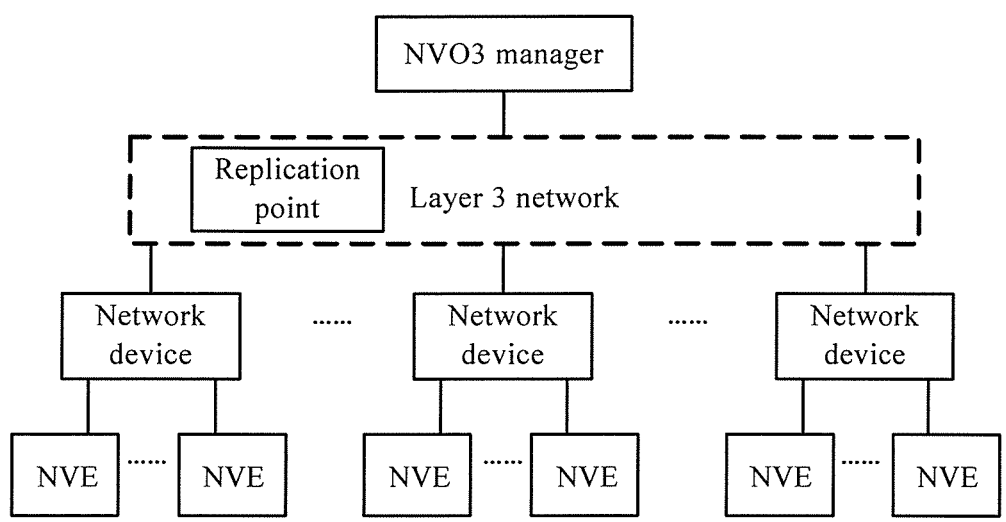
FIG. 6 is a diagram of a network architecture in which a replication point is added on a basis of FIG. 1.

Alternatively, another possible implementation of step 504 may be that, the unicast tunnel interface of the multicast group is a replication point; accordingly, step 504 is specifically that the first network device performs unicast tunnel interface on the first BUM packet and sends the first BUM packet to the replication point, and the replication point replicates the first BUM packet to the second network device corresponding to the multicast group. In this manner, a network entity, the replication point, needs to be added to the network architecture shown in FIG. 1. The replication point may be the same as the network device in a physical form and have replicating and forwarding functions, and may be a switch or router. FIG. 6 is a diagram of a network architecture diagram in which a replication point is added on the basis of FIG. 1. As shown in FIG. 6, the replication point may be disposed between the NVO3 manager and the network devices.

Step 505: The second network device replicates the first BUM packet to the third NVE through an NVE interface of the multicast group.

Specifically, the second network device determines, according to the packet header in the first BUM packet, that the multicast group corresponding to the first BUM packet is the first multicast group; then determines that, among NVEs connected to the second network device, an NVE belonging to the first multicast group is the third NVE; and therefore replicates the BUM packet to the third NVE.

In this embodiment, a first NVE performs multicast tunnel encapsulation on a first BUM packet to be sent, which implements that a packet header of the first BUM packet carries multicast group information of the first BUM packet; then, the first NVE sends the first BUM packet to a first network device; the first network device replicates the BUM packet to a second NVE that is also of a first multicast group and connected to the first network device; in addition, the network device performs unicast tunnel encapsulation on the first BUM packet and replicates the first BUM packet to a second network device corresponding to the multicast group through a unicast tunnel interface of the multicast group; and the second network device replicates the first BUM packet to a third NVE. In a solution according to this embodiment, because a network device sends a first BUM packet to at least one another network device corresponding to a multicast group through a unicast tunnel interface of the multicast group, that is, sends the first BUM packet still in a unicast manner, an original design of the network device is met, and the network device does not need to be modified to support bidirectional multicast transmission. Therefore, an implementation cost may be reduced.

Figure 7:
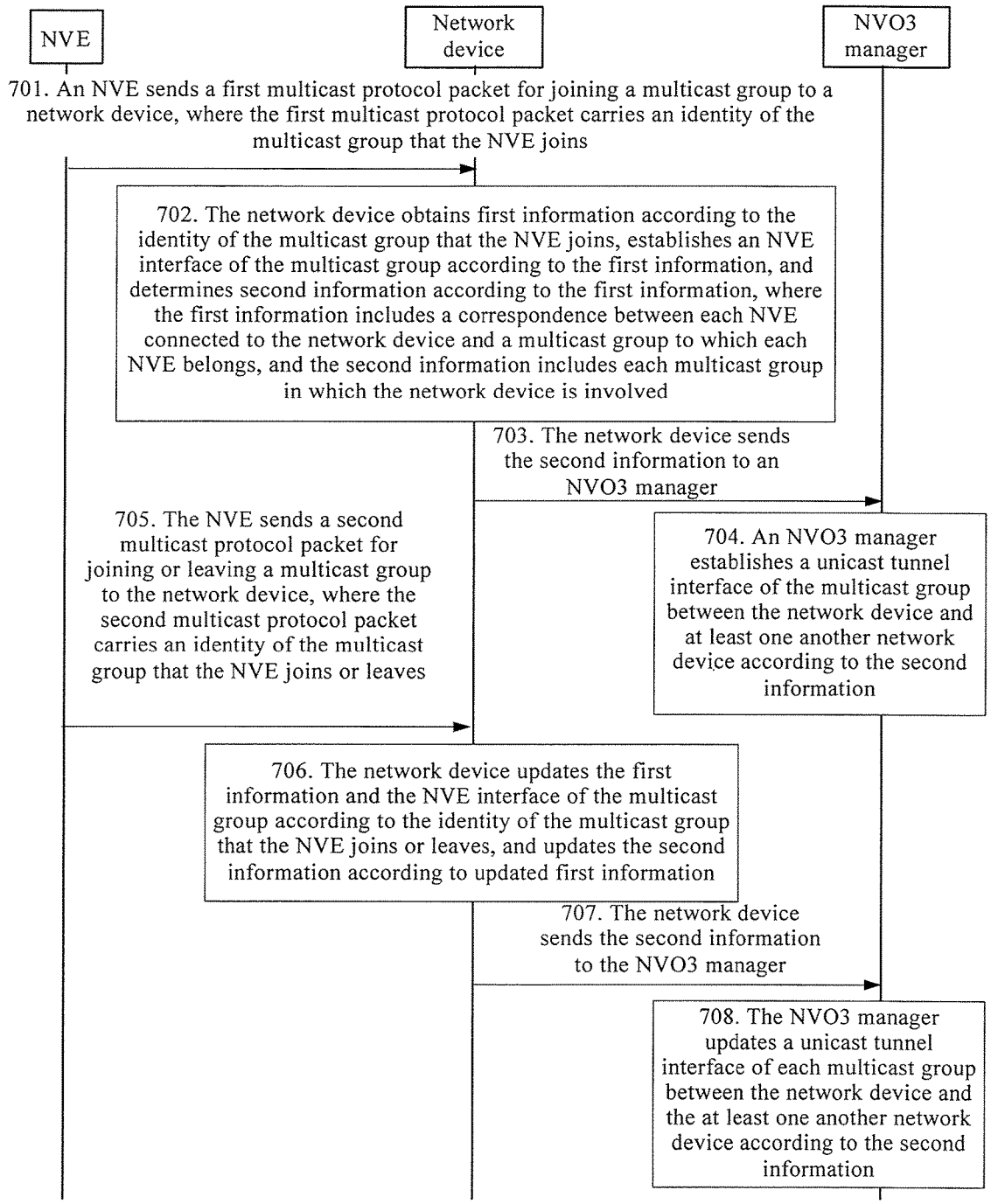
FIG. 7 is a signaling flowchart of a method for data transmission according to Embodiment 5 of the present invention.

FIG. 7 is a signaling flowchart of a method for data transmission according to Embodiment 5 of the present invention. In this embodiment, a process of performing interaction between an NVE, a network device, and an NVO3 manager to establish and update an NVE interface of a multicast group and a unicast tunnel interface of the multicast group is described, where a process of establishing the NVE interface of the multicast group and the unicast tunnel interface of the multicast group in this embodiment needs to be performed before the method according to the embodiment shown in FIG. 5 (before step 501), and is used as a basis of the method according to the embodiment shown in FIG. 5; and a process of updating the NVE interface of the multicast group and the unicast tunnel interface of the multicast group, and the steps in the embodiment shown in FIG. 5 have no sequential relationship. The network architecture shown in FIG. 1 may be used in this embodiment, where there may be a plurality of NVEs and network devices. In this embodiment, because operations performed by the NVEs are similar, operations performed by the network devices are similar, and interaction between the NVEs and between the network devices is not involved, for convenience of description, in steps of this embodiment, identifiers of the NVEs and identifiers of the network devices are not differentiated, and names, such as a first NVE and a first network device, are used when the steps are described by using an example. As shown in FIG. 7, the method according to this embodiment includes the following:

Step 701: The NVE sends a first multicast protocol packet for joining a multicast group to the network device, where the first multicast protocol packet carries an identifier of the multicast group that the NVE joins.

During specific implementation, when a first NVE detects for the first time that one VM or host connected to the first NVE joins a first multicast group, it is determined that the first NVE belongs to the first multicast group, and a multicast tunnel of the first multicast group needs to be established; therefore, execution of step 701 is triggered. Subsequently, when it is detected that another VM or host connected to the first NVE joins the first multicast group, step 701 does not need to be executed.

Step 702: The network device obtains first information according to the identifier of the multicast group that the NVE joins, establishes an NVE interface of the multicast group according to the first information, and determines second information according to the first information, where the first information includes a correspondence between each NVE connected to the network device and a multicast group to which each NVE belongs, and the second information includes each multicast group in which the network device is involved.

Specifically, the network device collects information about multicast groups that all NVEs connected to the network device join, so as to obtain the first information, and establish a multicast tunnel and determine the second information according to the first information.

It should be noted that the first multicast group and a second multicast group each are identified by a multicast group identifier. The first information is used to indicate multicast groups to which NVEs connected to the network device belong. For example, (assuming that) for the first network device, the first information is that the first NVE belongs to the first multicast group and the second NVE belongs to the first multicast group and the second multicast group. The second information is used to indicate multicast groups corresponding to the network device. For example, for the first network device, the second information includes multicast groups in which the second network device is involved, i.e., the first multicast group and the second multicast group.

Step 703: The network device sends the second information to the NVO3 manager.

Step 704: The NVO3 manager establishes a unicast tunnel interface of a multicast group between the network device and at least one another network device according to the second information.

Further, a possible implementation of step 704 may be that, the NVO3 manager determines, according to the second information, network devices involved in each multicast group; then, based on each multicast group, configures an interface reaching at least one another network device involved in the multicast group for each network device, for example, uses an IP address of the at least one another network device involved in the multicast group as the unicast tunnel interface of the multicast group.

Further, another possible implementation of step 704 may be that:

the NVO3 manager configures a list of unicast tunnels between network devices in each multicast group for a replication point according to the second information, uses the replication point as the unicast tunnel interface of the multicast group between the network device and the at least one another network device, and uses the replication point as a relay point for transmitting a BUM packet.

The network architecture shown in FIG. 6 needs to be used for this manner. The replication point may be the same as the network device in a physical form and have replicating and forwarding functions, and may be a switch or router. The replication point may be disposed between the NVO3 manager and the network devices, and data transmission between the replication point and the network devices is performed by using a unicast tunnel.

Specifically, the NVO3 manager may determine, according to the second information, the network devices involved in each multicast group; then, based on distribution of each of multicast group on network devices, configure the list of the unicast tunnels between the network devices in each multicast group for the replication point, where the list of the unicast tunnels between the network devices in each multicast group may include IP addresses of all the network devices involved in each multicast group; and use the replication point as the unicast tunnel interface of the multicast group between the network device and at least one another network device. In this manner, packet transmission also corresponds to the second implementation of step 504 in the embodiment shown in FIG. 5. That is, when receiving a BUM packet, the network device performs unicast tunnel encapsulation on the BUM packet and sends the BUM packet to the replication point; the replication point finds, according to a list of unicast tunnels between network devices in the multicast group, network devices that are involved in a multicast group corresponding to the BUM packet, and replicates the BUM packet to involved network devices according to the list of the unicast tunnels between the network devices in the multicast group.

In this implementation, a step that the replication point needs to execute to establish the unicast tunnel interface of the multicast group is:

receiving the list that is sent by the NVO3 manager and of the unicast tunnels between the network devices in the multicast group, and using the list of the unicast tunnels between the network devices in the multicast group as the unicast tunnel interface of the multicast group.

Steps that the replication point needs to execute to replicate and transmit the BUM packet are as follows:

Step 1: The replication point receives the BUM packet sent by the network device.

Step 2: The replication point replicates, according to the list of the unicast tunnels between the network devices in the multicast group, the BUM packet to a network device corresponding to the multicast group.

A technical effect of using this implementation is that, a packet replicating function is executed by the replication point, and the network devices do not need to perform replication, thereby saving network bandwidth required for packet replication. In addition, an NVO3 manager does not need to configure a unicast tunnel interface of a multicast group for each network device, and only needs to configure one network entity, the replication point, where a plurality of configuration objects are decreased to one, which may improve configuration efficiency.

During specific implementation, a plurality of replication points may also be disposed. For example, different replication points may be allocated by VNI/VSID, where packets in virtual networks corresponding to some VNIs or VSIDs may be allocated to one replication point for replication and transmission, and packets in virtual networks corresponding to other VNIs or VSIDs may be allocated to another replication point for replication and transmission. In order to ensure configuration efficiency and reduce a cost, the number of replication points may be controlled to be less than the number of network devices.

Further, in this embodiment, after step 702, a process of updating the first information and the second information may be further included, so as to update the NVE interface of the multicast group and the unicast tunnel interface of the multicast group. Specifically, the following may be further included:

Step 705: The NVE sends a second multicast protocol packet for joining or leaving a multicast group to the network device, where the second multicast protocol packet carries an identifier of the multicast group that the NVE joins or leaves.

For example, when another VM or host in VMs or hosts connected to the first NVE joins the second multicast group or another multicast group, or when one VM or host belonging to the first multicast group leaves the first multicast group, execution of step 705 is triggered.

Step 706: The network device updates the first information and an NVE interface of the multicast group according to the identifier of the multicast group that the NVE joins or leaves, and updates the second information according to the first information.

It may be understood that, because the second information includes the multicast group in which the network device is involved, when a first NVE of a multicast group joins or a last NVE of a multicast group leaves, the second information changes. Therefore, a moment for the network device to update the second information is when a first NVE of a multicast group joins or when a last NVE of a multicast group leaves. Seen from a perspective of the network device, that a first NVE of a multicast group joins may be establishing a first NVE interface of the multicast group, and that a last NVE of a multicast group leaves may be deleting a last NVE interface of the multicast group.

Further, it is possible that, when leaving a multicast group, some NVEs do not send a multicast protocol packet for leaving a multicast group to the network device. In this case, the network device may perform multicast group query on each NVE according to a preset time period. The multicast group query may be performed in two manners. One is specific group query, where information about members of a specific multicast group is queried and an identifier of the multicast group to be queried is carried in a packet; the other is general group query, where information about members of all multicast groups is queried and a packet does not include an identifier of a multicast group to be queried. Reference may be made to the foregoing description for specific content of the two manners of multicast group query, which is not described herein again.

Step 707: The network device sends the second information to the NVO3 manager.

Step 708: The NVO3 manager updates the unicast tunnel interface of the multicast group between the network device and the at least one another network device according to the second information.

In this embodiment, an NVE sends a first multicast protocol packet for joining a multicast group to a network device, so that the network device learns first information indicating multicast groups to which NVEs belong, determines second information indicating several multicast groups to which the network device itself belongs, and sends the second information to an NVO3 manager. Then the network device may establish an NVE interface of each multicast group on the network device according to the first information, and the NVO3 manager may establish a unicast tunnel interface of each multicast group between the network device and at least one another network device according to second information, so that a BUM packet may be replicated and transmitted between the NVE and the network device in a multicast manner, and may be replicated and transmitted between network devices in a unicast manner. In addition, when a multicast group state of the NVE changes, the network device can learn the change and update the first information and the second information, thereby updating a multicast tunnel and the unicast tunnel interface of the multicast group, so as to ensure that the BUM packet is replicated and transmitted correctly.

Figure 8:
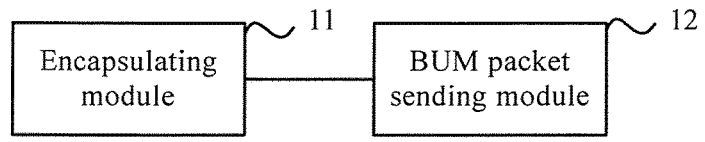
FIG. 8 is a schematic structural diagram of an NVE according to Embodiment 1 of the present invention.

FIG. 8 is a schematic structural diagram of an NVE according to Embodiment 1 of the present invention. As shown in FIG. 8, the NVE 800 according to this embodiment may include an encapsulating module 11 and a BUM packet sending module 12, where:

the encapsulating module 11 is configured to perform multicast tunnel encapsulation on a first BUM packet to be sent, where the multicast tunnel encapsulation includes adding information for indicating a multicast group to which the first BUM packet belongs to the first BUM packet; and the BUM packet sending module 12 is configured to send the first BUM packet on which the multicast tunnel encapsulation is performed to a network device, so that the network device replicates the first BUM packet to another NVE of the multicast group and connected to the network device, and/or that the network device performs unicast tunnel encapsulation on the first BUM packet and replicates the first BUM packet to at least one another network device corresponding to the multicast group through a unicast tunnel interface of the multicast group.

The NVE according to this embodiment may be used to execute a technical solution according to the method embodiment shown in FIG. 2 or a technical solution executed by a corresponding NVE in the method embodiment shown in FIG. 5. Implementation principles of the NVEs are similar and are not described herein again.

An NVE according to this embodiment performs multicast tunnel encapsulation on a first BUM packet to be sent, which implements that a packet header of the first BUM packet carries multicast group information of the BUM packet; then, the NVE sends the first BUM packet to a network device, so that the network device replicates the first BUM packet to another NVE of the multicast group, or that the network device performs unicast tunnel encapsulation on the first BUM packet and replicates the first BUM packet to at least one another network device corresponding to the multicast group through a unicast tunnel interface of the multicast group. In a solution according to this embodiment, because the network device sends the BUM packet to the at least one another network device corresponding to the multicast group through the unicast tunnel interface of the multicast group, that is, sends the BUM packet still in a unicast manner, an original design of the network device is met, and the network device does not need to be modified to support bidirectional multicast transmission. Therefore, an implementation cost may be reduced.

Figure 9:
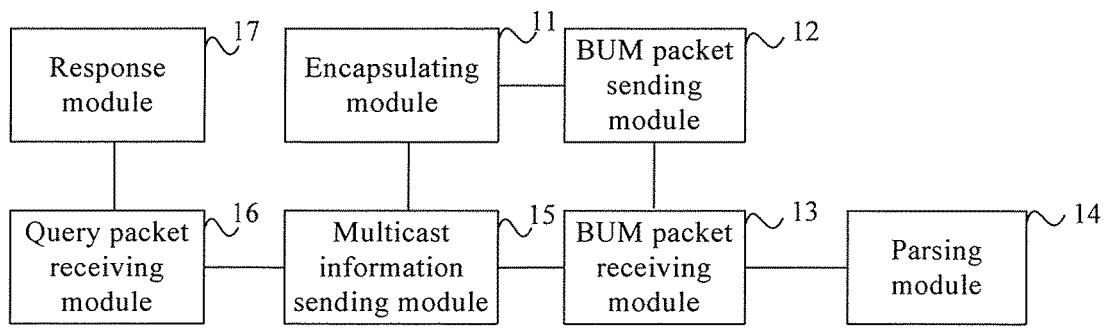
FIG. 9 is a schematic structural diagram of an NVE according to Embodiment 2 of the present invention.

FIG. 9 is a schematic structural diagram of an NVE according to Embodiment 2 of the present invention. As shown in FIG. 9, based on the NVE according to the embodiment shown in FIG. 8, the NVE 900 according to this embodiment may further include:

a BUM packet receiving module 13, which may be configured to receive a second BUM packet sent by the network device, where multicast tunnel encapsulation is performed on the second BUM packet; and a parsing module 14, which may be configured to perform multicast tunnel decapsulation on the second BUM packet, parse the second BUM packet, and send the second BUM packet to a corresponding virtual machine according to information obtained through the parsing.

Further, the NVE according to this embodiment may further include:

a multicast information sending module 15, configured to: before the first BUM packet on which the multicast tunnel encapsulation is performed is sent to the network device, or before the NVE receives the second BUM packet sent by the network device, send a first multicast protocol packet for joining the multicast group to the network device, where the first multicast protocol packet carries the identifier of the multicast group, so that the network device obtains first information, adds an NVE interface of the multicast group on the network device according to the first information; determines second information according to the first information, and sends the second information to a network virtualization over L3 NVO3 manager, so that the NVO3 manager establishes a unicast tunnel interface of the multicast group between the network device and at least one another network device according to the second information, where the first information includes a correspondence between each NVE connected to the network device and a multicast group to which each NVE belongs, and the second information includes each multicast group in which the network device is involved.

Further, the multicast information sending module 15 may be further configured to send a second multicast protocol packet for joining or leaving a multicast group to the network device, where the second multicast protocol packet carries an identifier of the multicast group that the NVE joins or leaves, so that the network device updates, according to the identifier of the multicast group that the NVE joins or leaves, the first information and an NVE interface of the multicast group that the NVE joins or leaves, updates the second information according to the first information, and sends updated second information to the NVO3 manager, so that the NVO3 manager updates a unicast tunnel interface of the multicast group between the network device and the at least one another network device according to the updated second information.

Further, the NVE according to this embodiment may further include:

a query packet receiving module 16, configured to receive a multicast group state query packet sent by the network device, where the multicast group state query packet carries an identifier of a multicast group; and a response module 17, configured to: when the NVE belongs to a multicast group corresponding to the identifier of the multicast group, send a response packet to the network device; and when the NVE does not belong to the multicast group corresponding to the identifier of the multicast group, send no response packet to the network device, so that the network device determines that the NVE has left the multicast group corresponding to the identifier of the multicast group, updates the first information and an NVE interface of the multicast group, updates the second information according to the first information, and sends updated second information to the NVO3 manager, so that the NVO3 manager updates a unicast tunnel interface of the multicast group between the network device and the at least one another network device according to the updated second information.

Further, the query packet receiving module 16 may be further configured to receive a multicast group state query packet sent by the network device.

The response module 17 may be further configured to send a response packet to the network device, where the response packet carries information about each multicast group to which the NVE belongs, so that the network device determines whether it is necessary to update the first information and an NVE interface of each multicast group, update the second information according to the first information, and send updated second information to the NVO3 manager, so that the NVO3 manager updates a unicast tunnel interface of each multicast group between the network device and the at least one another network device according to the updated second information.

The NVE according to this embodiment may be used to execute a technical solution according to the method embodiment shown in FIG. 2 or a technical solution executed by a corresponding NVE in the method embodiment shown in FIG. 7. Implementation principles and technical effects of the NVEs are similar and are not described herein again.

Figure 10:
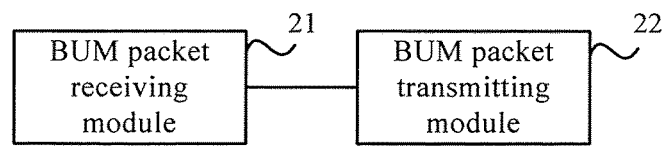
FIG. 10 is a schematic structural of a network device according to Embodiment 1 of the present invention.

FIG. 10 is a schematic structural diagram of a network device according to Embodiment 1 of the present invention. As shown in FIG. 10, the network device 1000 according to this embodiment may include a BUM packet receiving module 21 and a BUM packet transmitting module 22, where:

the BUM packet receiving module 21 may be configured to receive a first BUM packet that is sent by a network virtualization edge NVE and on which multicast tunnel encapsulation is performed, where the first BUM packet on which the multicast tunnel encapsulation is performed carries information about a multicast group corresponding to the first BUM packet; and the BUM packet transmitting module 22 may be configured to: replicate the first BUM packet to another NVE that belongs to the multicast group and is connected to the network device; and/or perform unicast tunnel encapsulation on the first BUM packet and replicate the first BUM packet to at least one another network device corresponding to the multicast group through a unicast tunnel interface of the multicast group.

The network device according to this embodiment may be used to execute a technical solution according to the method embodiment shown in FIG. 3 or a technical solution executed by a corresponding network device in the method embodiment shown in FIG. 5. Implementation principles of the network devices are similar and are not described herein again.

According to this embodiment, after a first BUM packet that is sent by an NVE and on which multicast tunnel encapsulation is performed is received, the first BUM packet is replicated, according to information that is about a multicast group and carried in the first BUM packet, to another NVE that belongs to the multicast group and is connected to a network device, and/or unicast tunnel encapsulation is performed on the first BUM packet and the first BUM packet is replicated to at least one another network device corresponding to the multicast group through a unicast tunnel interface of the multicast group. In a solution according to this embodiment, because the network device sends the first BUM packet to the at least one another network device corresponding to the multicast group through the unicast tunnel interface of the multicast group, that is, sends the BUM packet still in a unicast manner, an original design of the network device is met, and the network device does not need to be modified to support bidirectional multicast transmission. Therefore, an implementation cost may be reduced.

Further, for the network device according to the foregoing embodiment, the BUM packet receiving module 21 may be further configured to receive, through the unicast tunnel interface of the multicast group, a second BUM packet sent by the at least one another network device.

The BUM packet transmitting module 22 may be further configured to: after the network device performs unicast tunnel decapsulation on the second BUM packet, replicate the second BUM packet to an NVE that is connected to the network device and belongs to the multicast group.

Figure 11:
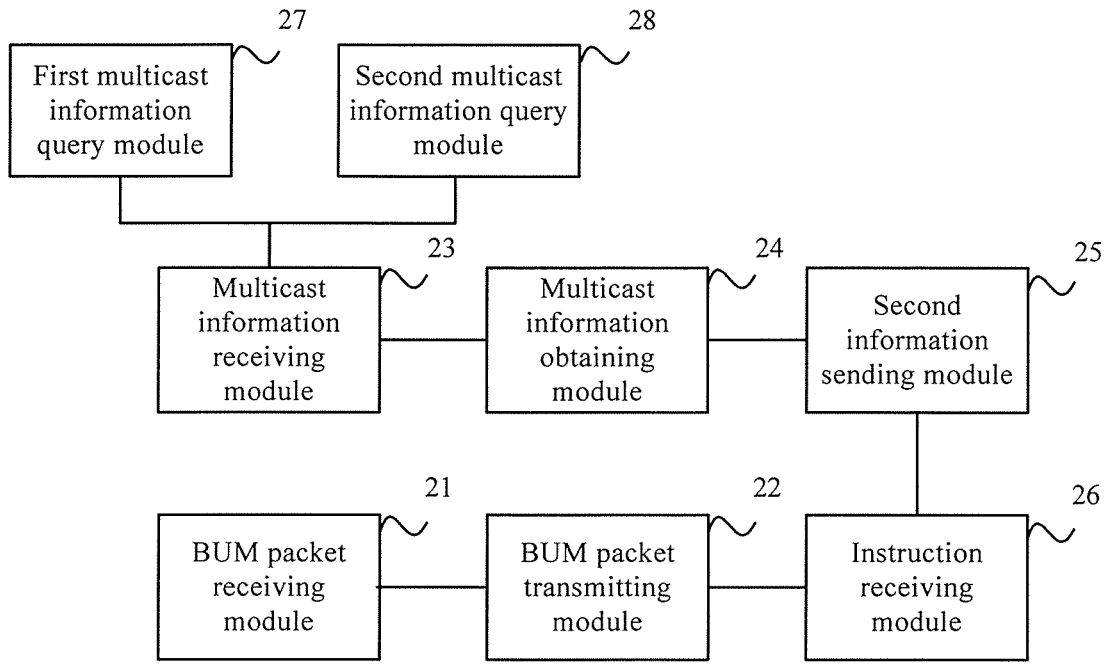
FIG. 11 is a schematic structural of a network device according to Embodiment 2 of the present invention.

FIG. 11 is a schematic structural diagram of a network device according to Embodiment 2 of the present invention. As shown in FIG. 11, based on the network device shown in FIG. 10, the network device 1100 according to this embodiment may further include:

a multicast information receiving module 23, configured to receive a first multicast protocol packet sent by the NVE for joining the multicast group, where the first multicast protocol packet carries the identifier of the multicast group;

a multicast information obtaining module 24, configured to obtain first information according to the identifier of the multicast group, establish an NVE interface of the multicast group according to the first information, and determine second information according to the first information, where the first information includes a correspondence between each NVE connected to the network device and a multicast group to which each NVE belongs, and the second information includes each multicast group in which the network device is involved; and a second information sending module 25, configured to send the second information to a network virtualization over L3 NVO3 manager, so that the NVO3 manager establishes the unicast tunnel interface of the multicast group between the network device and the at least one another network device according to the second information.

Further, the second information sending module 25 may be specifically configured to:

send the second information to the NVO3 manager;

the network device may further include an instruction receiving module 26, configured to receive a unicast tunnel interface configuration instruction that is of the multicast group and sent by the NVO3 manager according to the second information, and establish the unicast tunnel interface of the multicast group.

Further, the second information sending module 25 may be specifically configured to:

send the second information to the NVO3 manager, so that the NVO3 manager configures a list of unicast tunnels between network devices in the multicast group for a replication point according to the second information, and use the replication point as the unicast tunnel interface of the multicast group between the network device and the at least one another network device.

Further, the multicast information receiving module 23 may be further configured to:

receive a second multicast protocol packet sent by the NVE for joining or leaving a multicast group, where the second multicast protocol packet carries an identifier of the multicast group that the NVE joins or leaves;

the multicast information obtaining module 24 may be further configured to update, according to the identifier of the multicast group that the NVE joins or leaves, the first information and an NVE interface of the multicast group, and update the second information according to the first information; and the second information sending module 25 may be further configured to send updated second information to the NVO3 manager, so that the NVO3 manager updates a unicast tunnel interface of the multicast group between the network device and the at least one another network device according to the updated second information.

Further, the network device according to this embodiment may further include:

a first multicast information query module 27, configured to send a multicast group state query packet to the NVE, where the multicast group state query packet carries an identifier of a multicast group;

the multicast information obtaining module 24 may be further configured to: when no response packet sent by the NVE is received within a preset time, determine that the NVE has left a multicast group corresponding to the identifier of the multicast group, update the first information and an NVE interface of the multicast group that the NVE joins or leaves, and update the second information according to the first information; and the second information sending module 25 may be further configured to send updated second information to the NVO3 manager, so that the NVO3 manager updates a unicast tunnel interface of the multicast group between the network device and the at least one another network device according to the updated second information.

Further, the network device according to this embodiment may further include:

a second multicast information query module 28, configured to send a multicast group state query packet to the NVE;

the multicast information receiving module 23 may be further configured to receive a response packet sent by the NVE, where the response packet carries information about each multicast group to which the NVE belongs;

the multicast information obtaining module 24 may be further configured to: when determining that the information about each multicast group to which the NVE belongs changes, update the first information and an NVE interface of each multicast group, and update the second information according to the first information; and the second information sending module 25 may be further configured to send updated second information to the NVO3 manager, so that the NVO3 manager updates a unicast tunnel interface of each multicast group between the network device and the at least one another network device according to the updated second information.

The network device according to this embodiment may be used to execute a technical solution according to the method embodiment shown in FIG. 3 or a technical solution executed by a corresponding network device in the method embodiment shown in FIG. 7. Implementation principles and technical effects of the network devices are similar and are not described herein again.

Figure 12:
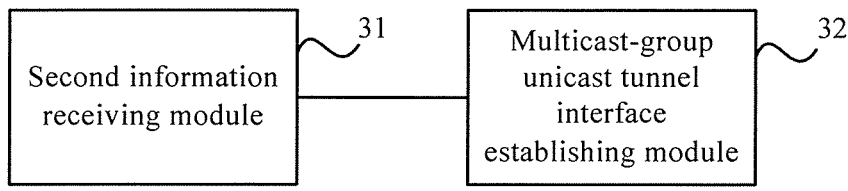
FIG. 12 is a schematic structural diagram of an NVO3 manager according to an embodiment of the present invention.

FIG. 12 is a schematic structural diagram of an NVO3 manager according to an embodiment of the present invention. As shown in FIG. 12, the NVO3 manager 1200 according to this embodiment may include a second information receiving module 31 and a multicast-group unicast tunnel interface establishing module 32, where:

the second information receiving module 31 may be configured to receive second information sent by a network device, where the second information includes a multicast group in which the network device is involved, the second information is determined by the network device according to first information, and the first information includes a correspondence between each NVE connected to the network device and a multicast group to which each NVE belongs; and the multicast-group unicast tunnel interface establishing module 32 may be configured to establish a unicast tunnel interface of the multicast group between the network device and at least one another network device according to the second information.

Further, the multicast-group unicast tunnel interface establishing module 32 may be specifically configured to:

send a unicast tunnel interface configuration instruction of the multicast group to the network device according to the second information, so that the network device establishes the unicast tunnel interface of the multicast group.

Alternatively, the multicast-group unicast tunnel interface establishing module 32 may be specifically configured to:

configure a list of unicast tunnels between network devices in the multicast group for a replication point according to the second information, and use the replication point as the unicast tunnel interface of the multicast group between the network device and the at least one another network device.

The NVO3 manager according to this embodiment may be used to execute a technical solution according to the method embodiment shown in FIG. 4 or execute a technical solution executed by a corresponding NVO3 manager in the method embodiment shown in FIG. 5 or FIG. 7. Implementation principles of the NVO3 managers are similar and are not described herein again.

An NVO3 manager according to this embodiment establishes, by using a multicast-group unicast tunnel interface establishing module and according to second information, a unicast tunnel interface of a multicast group between a network device and at least one another network device, so that the network device may perform, after receiving a BUM packet that is sent by an NVE and on which multicast tunnel encapsulation is performed, unicast tunnel encapsulation on the BUM packet, and replicate the BUM packet to at least one another network device corresponding to the multicast group through a unicast tunnel interface of the multicast group according to information that is about the multicast group and carried in the BUM packet. In a solution according to this embodiment, because the network device can send the BUM packet to the at least one another network device corresponding to the multicast group through the unicast tunnel interface of the multicast group, that is, sends the BUM packet still in a unicast manner, an original design of the network device is met, and the network device does not need to be modified to support bidirectional multicast transmission. Therefore, an implementation cost may be reduced.

Figure 13:
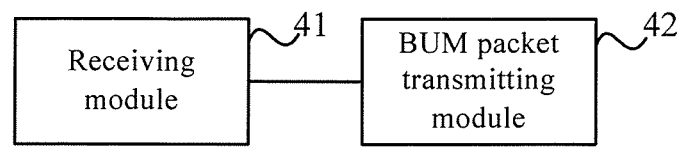
FIG. 13 is a schematic structural diagram of a replication point according to an embodiment of the present invention.

FIG. 13 is a schematic structural diagram of a replication point according to an embodiment of the present invention. As shown in FIG. 13, the replication point 1300 according to this embodiment may include a receiving module 41 and a BUM packet transmitting module 42, where:

the receiving module 41 may be configured to receive a BUM packet that is sent by a network device and on which multicast tunnel encapsulation and unicast tunnel encapsulation are performed, where the BUM packet on which the multicast tunnel encapsulation and the unicast tunnel encapsulation are performed carries information about a multicast group corresponding to the BUM packet; and the BUM packet transmitting module 42 may be configured to replicate the BUM packet to a network device corresponding to the multicast group according to a list of the unicast tunnels between network devices in the multicast group.

Further, the receiving module 41 may be further configured to:

receive a list that is of unicast tunnels between network devices in each multicast group and sent by a network virtualization over L3 NVO3 manager.

The replication point according to this embodiment may be used to execute a technical solution according to an implementation of step 504 in the method embodiment shown in FIG. 5 and a technical solution according to an implementation of step 704 in the method embodiment shown in FIG. 7. Implementation principles of the replication points are similar and are not described herein again.

A technical effect of the replication point according to this embodiment is that, a packet replicating function is executed by the replication point, and the network devices do not need to perform replication, thereby saving network bandwidth required for packet replication. In addition, an NVO3 manager does not need to configure a unicast tunnel interface of a multicast group for each network device, and only needs to configure the replication point, which may reduce configuration objects, thereby improving configuration efficiency.

Figure 14:
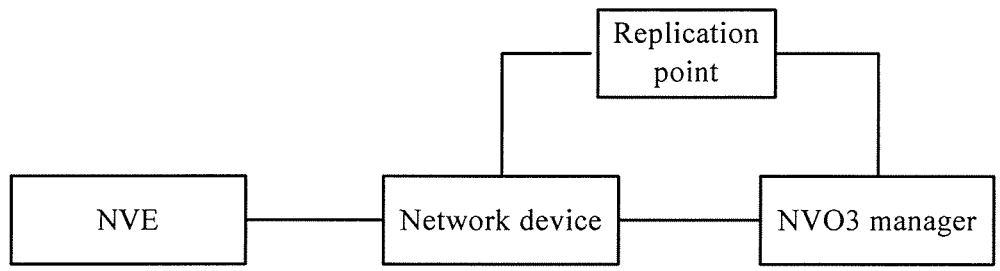
FIG. 14 is a schematic structural diagram of a system for data transmission according to an embodiment of the present invention.

FIG. 14 is a schematic structural diagram of a system for data transmission according to an embodiment of the present invention. As shown in FIG. 14, the system 1400 according to this embodiment may include an NVE, a network device, and an NVO3 manager, where the NVE may use a structure according to the apparatus embodiment shown in FIG. 8 or FIG. 9, the network device may use a structure according to the apparatus embodiment shown in FIG. 10 or FIG. 11, and the NVO3 manager may use a structure according to the apparatus embodiment shown in FIG. 12.

Further, the system for data transmission according to this embodiment may further include a replication point, where the replication point may use a structure according to the apparatus embodiment shown in FIG. 13.

The system for data transmission according to this embodiment may be used to execute a technical solution of the method embodiment shown in FIG. 5 or FIG. 7; implementation principles and technical effects of the systems are similar and are not repeatedly described in this embodiment.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for data transmission applied in a network, wherein the network comprises multiple network virtualization edges (NVEs), multiple network devices, and a network virtualization over L3 (NVO3) manager, wherein each NVE is connected to at least one virtual machine (VM) or host, and the NVO3 manager is used to manage the multiple network devices, wherein the method comprises:

receiving, by a network device, a first multicast protocol packet sent by a NVE for joining a multicast group, wherein the first multicast protocol packet carries an identifier of the multicast group;

obtaining, by the network device, first information according to the identifier of the multicast group; wherein the first information comprises a correspondence between each NVE connected to the network device and a multicast group to which said each NVE belongs, wherein the network device obtains the first information by collecting information about multicast groups that all NVEs connected to the network device join;

establishing an NVE interface of the multicast group according to the first information;

determining second information according to the first information, wherein the second information comprises each multicast group in which the network device is involved;

sending, by the network device, the second information to the NVO3 manager;

receiving, by the network device, a unicast tunnel interface configuration instruction that is of the multicast group sent by the NVO3 manager according to the second information; and
establishing, by the network device, a unicast tunnel interface of the multicast group between the network device and at least one another network device.

2. The method according to claim 1, further comprising:
receiving, by the network device, a second multicast protocol packet sent by the NVE for joining or leaving a multicast group, wherein the second multicast protocol packet carries an identifier of the multicast group that the NVE joins or leaves;
updating, by the network device according to the identifier of the multicast group that the NVE joins or leaves, the first information and an NVE interface of the multicast group that the NVE joins or leaves, and updating the second information according to the updated first information; and
sending, by the network device, updated second information to the NVO3 manager, wherein the updated second information is used to enable the NVO3 manager to update a unicast tunnel interface of each multicast group between the network device and the at least one another network device according to the updated second information.

3. The method according to claim 1, further comprising:
sending, by the network device, a multicast group state query packet to the NVE, wherein the multicast group state query packet carries an identifier of a multicast group;
when the network device receives no response packet sent by the NVE within a preset time, determining, by the network device, that the NVE has left the multicast group corresponding to the identifier of the multicast group, updating the first information and an NVE interface of the multicast group, and updating the second information according to the updated first information; and
sending, by the network device, updated second information to the NVO3 manager, so that wherein the updated second information is used to enable the NVO3 manager to update a unicast tunnel interface of each multicast group between the network device and the at least one another network device according to the updated second information.

4. The method according to claim 1, further comprising:
sending, by the network device, a multicast group state query packet to the NVE;
receiving, by the network device, a response packet sent by the NVE, wherein the response packet carries information about each multicast group to which the NVE belongs;
when the network device determines that the information about each multicast group to which the NVE belongs changes, updating the first information and an NVE interface of each multicast group, and updating the second information according to the updated first information; and
sending, by the network device, updated second information to the NVO3 manager, wherein the updated second information is used to enable the NVO3 manager to update a unicast tunnel interface of each multicast group between the network device and the at least one another network device according to the updated second information.

5. The method for data transmission according to claim 1, further comprising:
receiving, by the network device, a first broadcast, unknown unicast and multicast, BUM, (BUM) packet that is sent by the NVE and on which multicast tunnel encapsulation is performed, wherein the first BUM packet on which the multicast tunnel encapsulation is performed carries information about a multicast group corresponding to the first BUM packet, and executing at least one of the following steps:
replicating the first BUM packet to another NVE that belongs to the multicast group and is connected to the network device; and
performing unicast tunnel encapsulation on the first BUM packet and replicating the first BUM packet to at least one another network device corresponding to the multicast group through a unicast tunnel interface of the multicast group.

6. A network device applied in a network, wherein the network comprises multiple network virtualization edges (NVEs), multiple network devices, and a network virtualization over L3 (NVO3) manager, wherein each NVE is connected to at least one virtual machine (VM) or host, and the NVO3 manager is used to manage the multiple network devices, wherein the network device is one of the multiple network devices and comprises:
a memory having instructions stored therein, and
a processor coupled to the memory and configured to execute the instructions to:
receive a first multicast protocol packet sent by a NVE for joining a multicast group, wherein the first multicast protocol packet carries an identifier of the multicast group that the NVE joins;
obtain first information according to the identifier of the multicast group; wherein the first information comprises a correspondence between each NVE connected to the network device and a multicast group to which said each NVE belongs, wherein the network device obtains the first information by collecting information about multicast groups that all NVEs connected to the network device join;
establish an NVE interface of the multicast group according to the first information;
determine second information according to the first information, wherein the second information comprises each multicast group in which the network device is involved;
send the second information to the NVO3 manager;
receive a unicast tunnel interface configuration instruction that is of the multicast group sent by the NVO3 manager according to the second information; and
establish a unicast tunnel interface of the multicast group between the network device and at least one another network device.

7. The network device according to claim 6, wherein the processor is further configured to execute the instructions to:
receive a second multicast protocol packet sent by the NVE for joining or leaving a multicast group, wherein the second multicast protocol packet carries an identifier of the multicast group that the NVE joins or leaves;
update, according to the identifier of the multicast group that the NVE joins or leaves, the first information and an NVE interface of the multicast group that the NVE joins or leaves, and update the second information according to the first information; and
send updated second information to the NVO3 manager, wherein the updated second information is used to enable the NVO3 manager to update a unicast tunnel interface of each multicast group between the network device and the at least one another network device according to the updated second information.

8. The network device according to claim 6, wherein the processor is further configured to execute the instructions to:
send a multicast group state query packet to the NVE, wherein the multicast group state query packet carries an identifier of a multicast group;
when no response packet sent by the NVE is received within a preset time, determine that the NVE has left a multicast group corresponding to the identifier of the multicast group, update the first information and an NVE interface of the multicast group, and update the second information according to the first information; and
send updated second information to the NVO3 manager, wherein the updated second information is used to enable the NVO3 manager to update a unicast tunnel interface of each multicast group between the network device and the at least one another network device according to the updated second information.

9. The network device according to claim 6, wherein the processor is further configured to execute the instructions to:
send a multicast group state query packet to the NVE;
receive a response packet sent by the NVE, wherein the response packet carries information about each multicast group to which the NVE belongs;
when determining that the information about each multicast group to which the NVE belongs changes, update the first information and an NVE interface of each multicast group, and update the second information according to the first information; and
send updated second information to the NVO3 manager, wherein the updated second information is used to enable the NVO3 manager to update a unicast tunnel interface of each multicast group between the network device and the at least one another network device according to the updated second information.

10. The network device according to claim 6, wherein the processor is further configured to execute the instructions to:
receive a first broadcast, unknown unicast and multicast (BUM) packet that is sent by a network virtualization edge NVE and on which multicast tunnel encapsulation is performed, wherein the first BUM packet on which the multicast tunnel encapsulation is performed carries information about a multicast group corresponding to the first BUM packet; and
replicate the first BUM packet to another NVE that belongs to the multicast group and is connected to the network device; and/or perform unicast tunnel encapsulation on the first BUM packet and replicate the first BUM packet to at least one another network device corresponding to the multicast group through a unicast tunnel interface of the multicast group.

* * * * *